United States Patent
Bordes et al.

(10) Patent No.: US 11,936,871 B2
(45) Date of Patent: Mar. 19, 2024

(54) METHOD AND DEVICE FOR PICTURE ENCODING AND DECODING USING ILLUMINATION COMPENSATION

(71) Applicant: INTERDIGITAL MADISON PATENT HOLDINGS, SAS, Paris (FR)

(72) Inventors: Philippe Bordes, Laille (FR); Fabrice Leleannec, Mouazé (FR); Tangi Poirier, Thorigné-Fouillard (FR); Fabrice Urban, Thorigne Fouillard (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 241 days.

(21) Appl. No.: 17/429,077

(22) PCT Filed: Feb. 3, 2020

(86) PCT No.: PCT/US2020/016345
§ 371 (c)(1),
(2) Date: Aug. 6, 2021

(87) PCT Pub. No.: WO2020/163209
PCT Pub. Date: Aug. 13, 2020

(65) Prior Publication Data
US 2022/0159260 A1    May 19, 2022

(30) Foreign Application Priority Data

Feb. 8, 2019    (EP) .................................... 19305149
May 7, 2019    (EP) .................................... 19305584

(51) Int. Cl.
*H04N 19/132*    (2014.01)
*H04N 19/105*    (2014.01)
(Continued)

(52) U.S. Cl.
CPC ......... *H04N 19/132* (2014.11); *H04N 19/105* (2014.11); *H04N 19/176* (2014.11); *H04N 19/196* (2014.11)

(58) Field of Classification Search
None
See application file for complete search history.

(56) References Cited

U.S. PATENT DOCUMENTS

2017/0150183 A1    5/2017    Zhang et al.
2019/0200021 A1    6/2019    Park et al.

FOREIGN PATENT DOCUMENTS

EP    3503553 A1    6/2019
WO    WO 2017190288 A1    11/2017
(Continued)

OTHER PUBLICATIONS

Strom et al: "Description of Core Experiment 1 (CE1): Post-prediction and post-reconstruction filtering", Joint Video Experts Team (JVET) of ITU-T SG 16 WP 3 and ISO/IEC JTC 1/SC 29/WG 11, Document JVET-M1021_v7, 13th Meeting: Marrakech, Morroco, Jan. 9, 2019, 10 pages.
(Continued)

*Primary Examiner* — Xiaolan Xu
(74) *Attorney, Agent, or Firm* — CONDO ROCCIA KOPTIW LLP

(57) ABSTRACT

A method for reconstructing a picture block is disclosed, wherein the block is predicted using local illumination compensation. The parameters of local illumination compensation are determined according to a selection of reconstructed samples located to the left and above of the current block. In the case where some of them are unavailable, they may be replaced using different techniques.

14 Claims, 20 Drawing Sheets

(51) Int. Cl.
*H04N 19/176* (2014.01)
*H04N 19/196* (2014.01)

(56) References Cited

FOREIGN PATENT DOCUMENTS

| WO | WO 2018056603 A1 | 3/2018 |
|---|---|---|
| WO | 2019147810 A1 | 8/2019 |
| WO | WO 2019147910 A1 | 8/2019 |

OTHER PUBLICATIONS

Bossen, Frank, "VTM-3.0—Tags—JVET / VVCSoftware_VTM—GitLab", Internet URL: https://vcgit.hhi.fraunhofer.de/jvet/VVCSoftware_VTM/tags/VTM-3.0, retrieved on Jan. 30, 2020, 2 pages.

Anonymous, "Information Technology—Generic coding of moving pictures and associated audio information: Systems", International Organization for Standardization (ISO) and the International Electrotechnical Commission (IEC), Document: ISO/IEC 13818-1, Second edition, Dec. 1, 2000, 174 pages.

Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, Document JVET-G1001-v1; 7th Meeting: Torino, Italy, Jul. 13, 2017, 48 pages.

Anonymous, Series H: Audiovisual and Multimedia Systems—Infrastructure of audiovisual services—Coding of moving video: High Efficiency Video Coding, International Telecommunication Union, Recommendation ITU-T H.265, Oct. 2014, 540 pages.

Filippov et al., "CE1-related: Simplified and robust LIC parameter derivation unified with CCLM", Joint Video Experts Team (JVET) of ITU-T SG 16 WP 3 and ISO/IEC JTC 1/SC 29/WG 11, Document: JVET-N0716-v3, 14th Meeting: Geneva, Switzerland, Mar. 19, 2019, 8 pages.

Seregin et al., "CE10-related: Unidirectional illumination compensation", Joint Video Experts Team (JVET) of ITU-T SG 16 WP 3 and ISO/IEC JTC 1/SC 29/WG 11, Document: JVET-M0500-v3, 13 Meeting, Marrakech, Morroco, Jan. 9, 2019, 4 pages.

Anonymous, "Information Technology—Generic Coding of Moving Pictures and Associated Audio Information: Video", International Organization for Standardization (ISO) and the International Electrotechnical Commission (IEC), International Standard 13818-2, Recommendation ITU-T H.262, Document ISO 13818-2: 1995 (E), 1995, 255 pages.

Bordes et al., "CEI-related: on LIC reference samples selection", Joint Video Experts Team (JVET) of ITU-T SG 16 9 WP3 and ISO/IEC Jtc 1/SC 29/WG 11, Document: JVET-N0307-v2, 14th Meeting: Geneva, Switzerland, Mar. 19, 2019, 4 pages.

Figure 13C
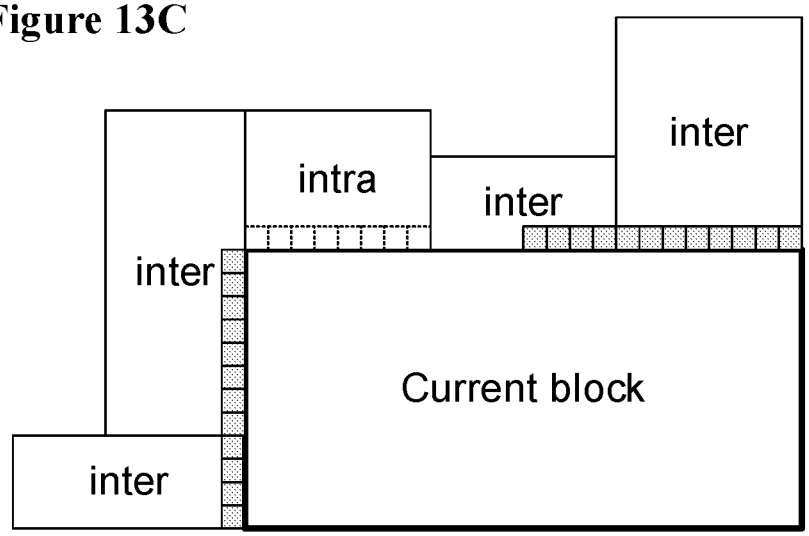
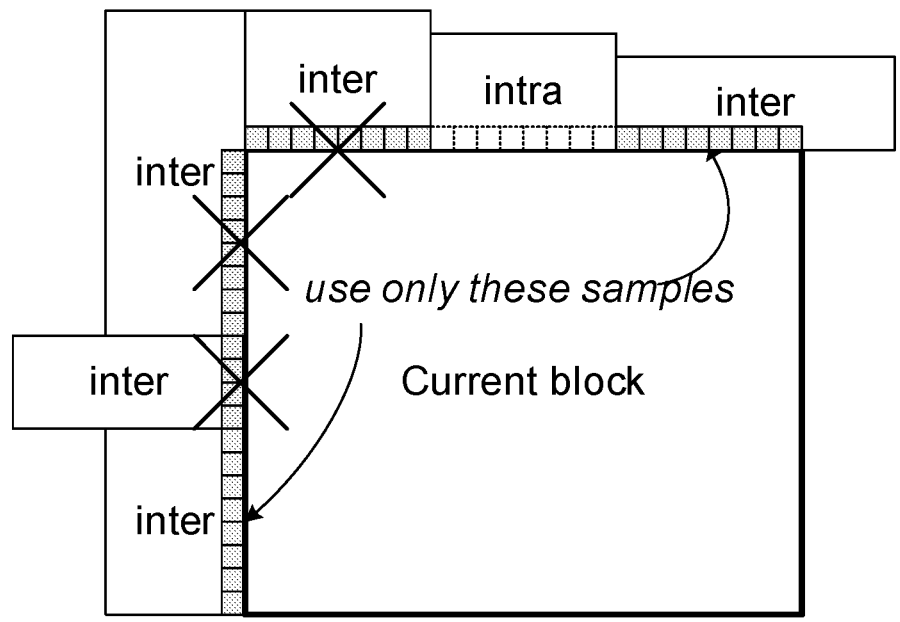
Figure 13D

METHOD AND DEVICE FOR PICTURE ENCODING AND DECODING USING ILLUMINATION COMPENSATION

CROSS REFERENCE TO RELATED APPLICATIONS

This application is the national stage entry under 35 U.S.C. § 371 of International Application PCT/US2020/016345, filed Feb. 3, 2020, which was published in accordance with PCT Article 21(2) on Aug. 13, 2020, in English, and which claims the benefit of European Patent Application No. 19305149.7, filed Feb. 8, 2019, and European Patent Application No. 19305584.5, filed May 7, 2019.

TECHNICAL FIELD

At least one of the present embodiments generally relates to a method and a device for picture encoding and decoding, and more particularly, to a method and a device for picture encoding and decoding with local illumination compensation (LIC).

BACKGROUND ART

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors or prediction residuals, are transformed, quantized and entropy coded. During encoding the original image block is usually partitioned/split into sub-blocks possibly using quad-tree partitioning for example. To reconstruct the video, the compressed data is decoded by inverse processes corresponding to the prediction, transform, quantization and entropy coding.

SUMMARY

According to a first aspect of at least one embodiment, a video encoding method comprises, for a block of a video, performing a local illumination compensation of the block by applying a function to predicted samples, wherein the function is a linear function whose parameters are determined according to selected reference samples.

According to a second aspect of at least one embodiment, a video decoding method comprises, for a block of a video, performing a local illumination compensation of the block by applying a function to predicted samples, wherein the function is a linear function whose parameters are determined according to selected reference samples.

According to a third aspect of at least one embodiment, a video encoding apparatus comprises an encoder configured to perform a local illumination compensation of the block by applying a function to predicted samples, wherein the function is a linear function whose parameters are determined according to selected reference samples.

According to a third aspect of at least one embodiment, a video decoding apparatus comprises a decoder configured to perform a local illumination compensation of the block by applying a function to predicted samples, wherein the function is a linear function whose parameters are determined according to selected reference samples.

According to a variant of first, second, third and fourth embodiments, the selection of the reference samples further comprises determining valid samples, a sample being considered as being valid when it is available; and determining the total number of reference samples, number of neighboring samples at the top of the block and number of valid neighboring samples at the left of the block. According to a further variant, the total number of reference samples is a power of 2. According to a further variant, the selection of samples at the top of the block and samples at the left of the block is balanced based on a ratio between the height and the width of the block. According to a further variant, when the block height is greater than or equal to the block width, the selection of samples is done by firstly selecting all valid neighboring samples at the left of the block and completing with valid neighboring samples at the top of the block and when the block height is smaller than the block width, the selection of samples is done by firstly selecting all valid neighboring samples at the top of the block and completing with valid neighboring samples at the left of the block. According to a further variant, when the number of valid neighboring samples at the top of the block is greater than or equal to the number of valid neighboring samples at the left of the block, the selection of samples is done by firstly selecting all valid neighboring samples at the top of the block and completing with valid neighboring samples at the left of the block and when the number of valid neighboring samples at the top of the block is smaller than the number of valid neighboring samples at the left of the block, the selection of samples is done by firstly selecting all valid neighboring samples at the left of the block and completing with valid neighboring samples at the top of the block.

According to a variant of first, second, third and fourth embodiments, missing samples are replaced. According to a further variant, missing samples are replaced by valid samples located on a same neighborhood, top or left. According to a further variant, missing samples are replaced by interpolating the closest valid samples based on the distance to the closest valid samples. According to a further variant, an additional sample located in the top left corner is added to the samples. According to a further variant, missing samples are replaced by copying a set of consecutive samples. According to a further variant, missing samples are replaced by samples obtained from additional line of neighboring samples at the top of the block. According to a further variant, missing samples are replaced by samples obtained from an extended set of neighboring samples at the top of the block and/or at the left of the block.

One or more of the present embodiments also provide a computer readable storage medium having stored thereon instructions for encoding or decoding video data according to at least part of any of the methods described above. One or more embodiments also provide a computer readable storage medium having stored thereon a bitstream generated according to the encoding methods described above. One or more embodiments also provide a computer program product including instructions for performing at least part of any of the methods described above.

DETAILED DESCRIPTION

Various embodiments relate to a Local Illumination Compensation feature of a video coding system and more specifically to the selection of the reference samples used to determine the compensation to apply. When some reference samples are missing, it is considered to replace them according to various embodiments described hereunder.

Moreover, the present aspects, although describing principles related to particular drafts of VVC (Versatile Video Coding) or to HEVC (High Efficiency Video Coding) specifications, are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Figure 1:
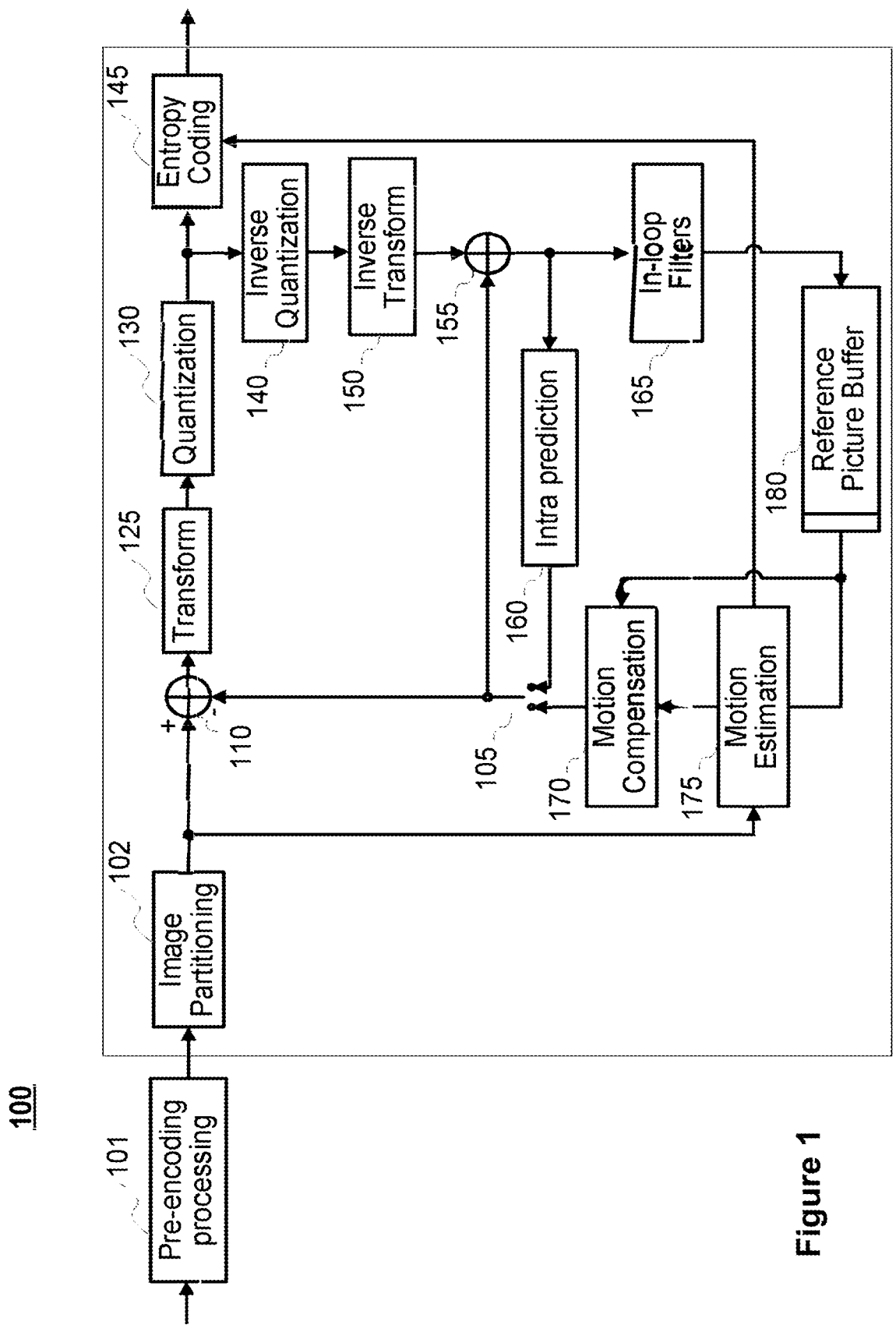
FIG. 1 illustrates a block diagram of a video encoder according to an embodiment.

FIG. 1 illustrates a video encoder 100. Variations of this encoder 100 are contemplated, but the encoder 100 is described below for purposes of clarity without describing all expected variations. Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset)), Adaptive Loop-Filter (ALF) filtering to reduce encoding artifacts. The filtered image is stored at a reference picture buffer (180).

Figure 2:
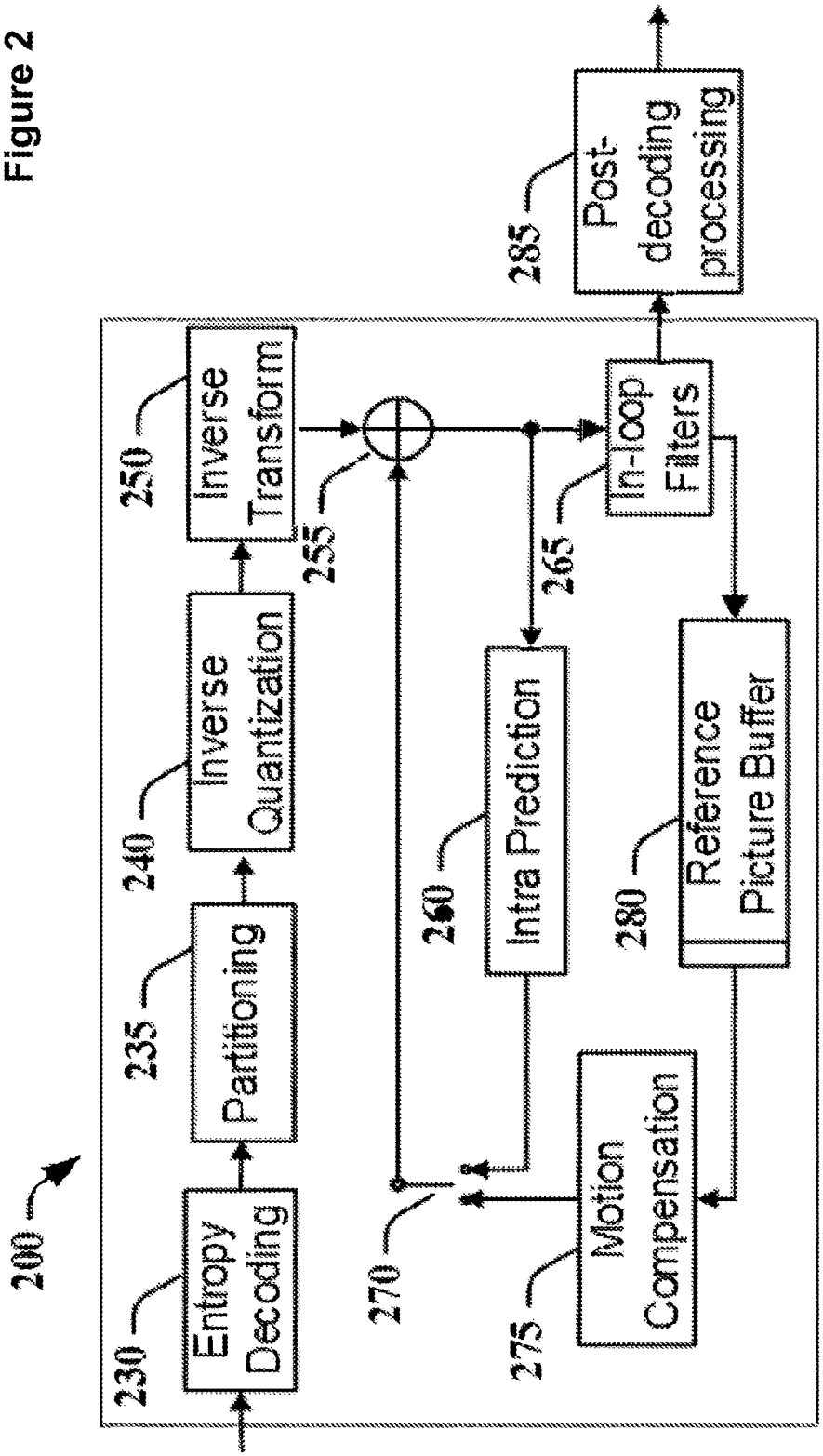
FIG. 2 illustrates a block diagram of a video decoder according to an embodiment.

FIG. 2 illustrates a block diagram of a video decoder 200. In the decoder 200, a bitstream is decoded by the decoder elements as described below. Video decoder 200 generally performs a decoding pass reciprocal to the encoding pass as described in FIG. 18. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

Figure 3:
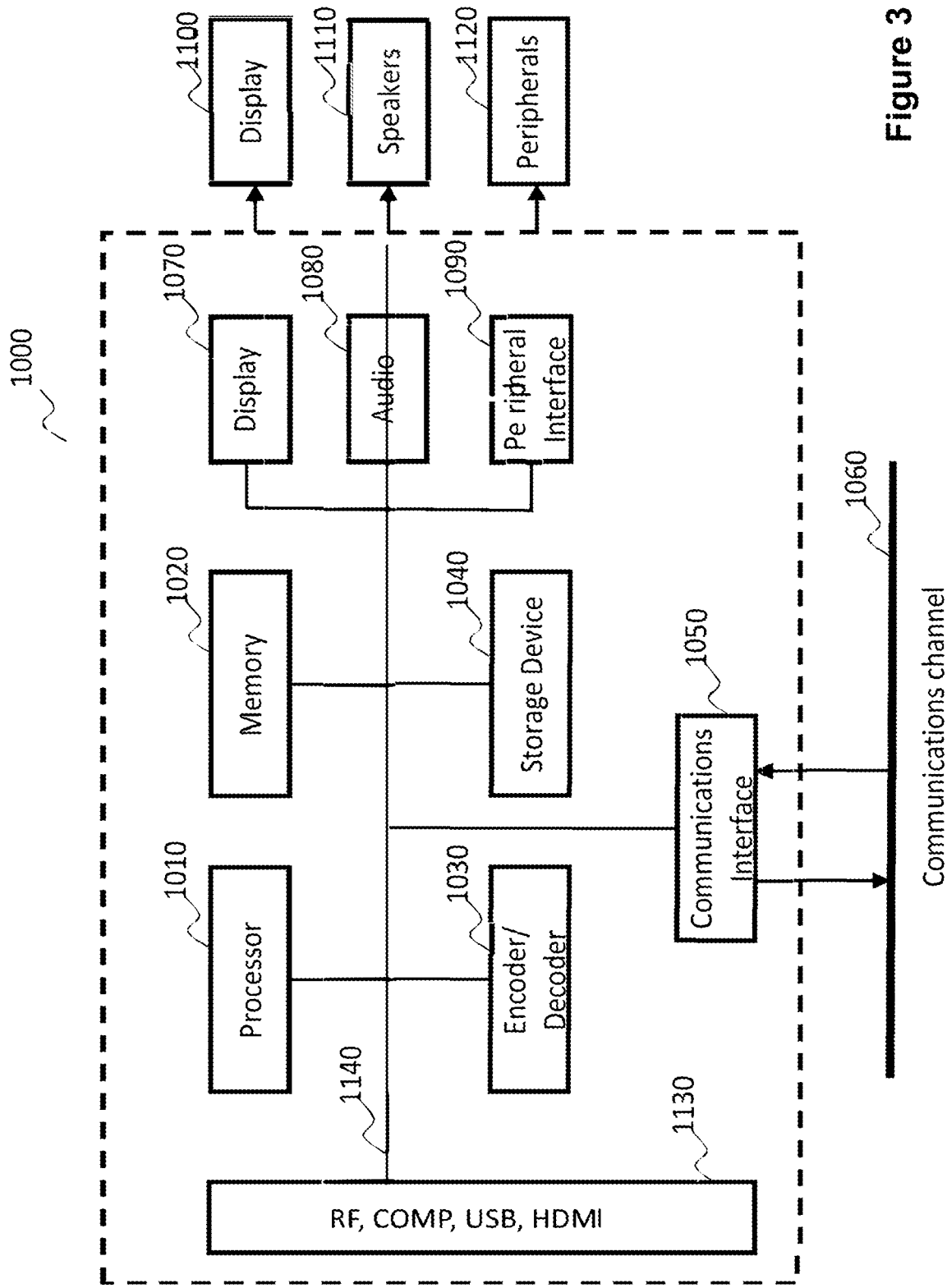
FIG. 3 illustrates a block diagram of an example of a system in which various aspects and embodiments are implemented.

FIG. 3 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or anon-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 18, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Figure 4:
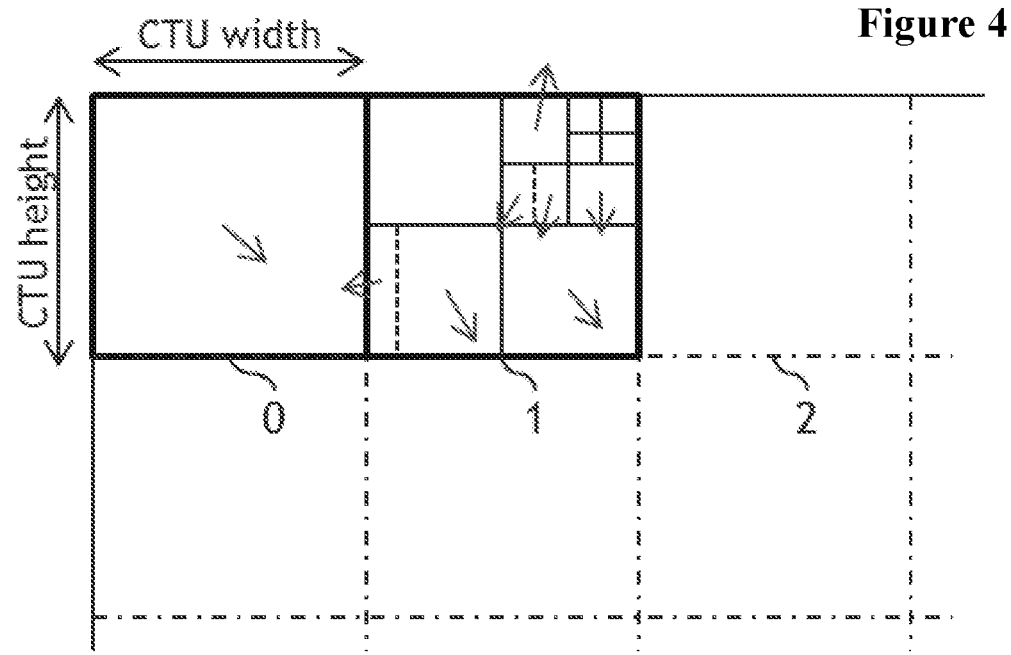
FIG. 4 illustrates an example of coding tree unit and coding tree in the compressed domain.

FIG. 4 illustrates an example of coding tree unit and coding tree in the compressed domain. In HEVC coding, a picture is partitioned into CTUs of square shape with a configurable size typically 64×64. The size may be 128× 128, or 256×256 in other video coding standards. A CTU is the root of a quad-tree partitioning into 4 square Coding Units (CU) of equal size, i.e. half of the parent block size in width and in height. A quad-tree is a tree in which a parent node can be split into four child nodes, each of which may become parent node for another split into four child nodes. In HEVC, a coding Block (CB) is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU.

In more recent encoding systems, a CTU is the root of a coding tree partitioning into Coding Units (CU). A coding tree is a tree in which a parent node (usually corresponding to a block) can be split into child nodes (e.g. into 2, 3 or 4 child nodes), each of which may become parent node for another split into child nodes. In addition to the quad-tree split mode, new split modes (binary tree symmetric split modes, binary tree asymmetric split modes and triple tree split modes) are also defined that increase the total number of possible split modes. The coding tree has a unique root node, e.g. a CTU. A leaf of the coding tree is a terminating node of the tree. Each node of the coding tree represents a block that may be further split into smaller blocks also named sub-blocks. Once the partitioning of a CTU into CUs is determined, CUs corresponding to the leaves of the coding tree are encoded. The partitioning of a CTU into CUs and the coding parameters used for encoding each CU (corresponding to a leaf of the coding tree) may be determined on the encoder side through a rate distortion optimization procedure.

In the present application, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of numerous sizes.

Figure 5:
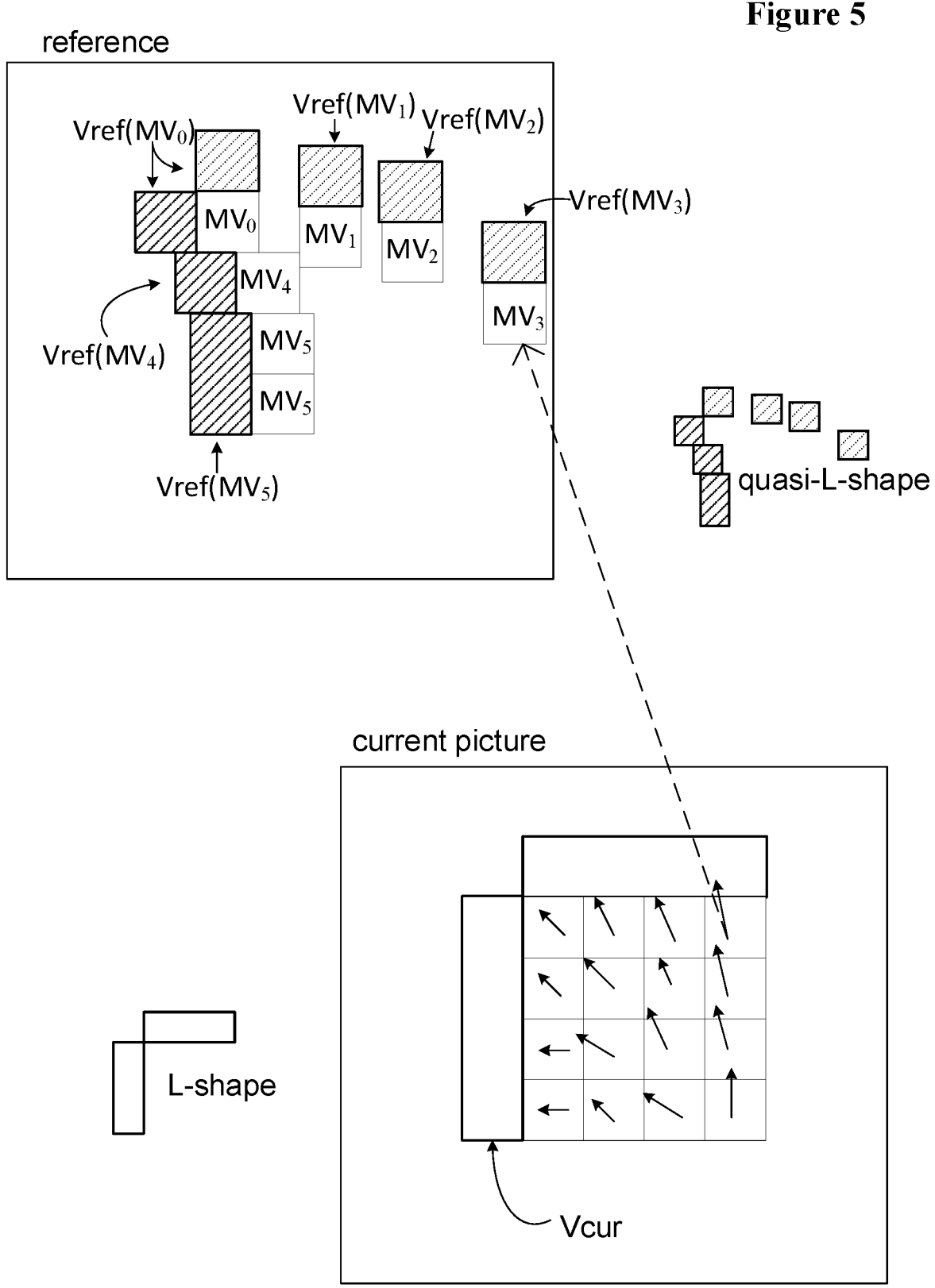
FIG. 5 illustrates a L-shape and quasi-L-shape.

FIG. 5 illustrates a L-shape and quasi-L-shape. In the present application, the term "L-shape" is term associated to the current block, to refer to a set composed of the samples situated on the row above the current block and of the samples situated on the column at the left of the current block, as depicted in grey in the figure. The top images illustrate the case where the coding unit is square while the bottom images illustrate the case where the coding unit is rectangular, more particularly where the width of the coding unit is greater than its height. A third case is also used where the coding unit is rectangular, and the width of the coding unit is smaller than its height.

For some particular sub-block based tools, the reference L-shape may be composed of non-adjacent samples—thus forming a quasi L-shape—if the motion vectors associated to each sub-blocks are different, as depicted in the figure.

Examples of sub-block based motion compensated prediction modes are known as "Affine merge motion prediction", "Affine AMVP" (Adaptive motion vector prediction) motion prediction, "SbTMVP" (Subblock-based temporal motion vector prediction), DMVR (Decoder side motion vector refinement).

In the present application, the terms "reconstructed" and "decoded" may be used interchangeably, the terms "pixel" and "sample" may be used interchangeably, the terms "image," "picture", "frame", "slice" and "tiles" may be used interchangeably. Usually, but not necessarily, the term "reconstructed" is used at the encoder side while "decoded" is used at the decoder side.

Figure 6:
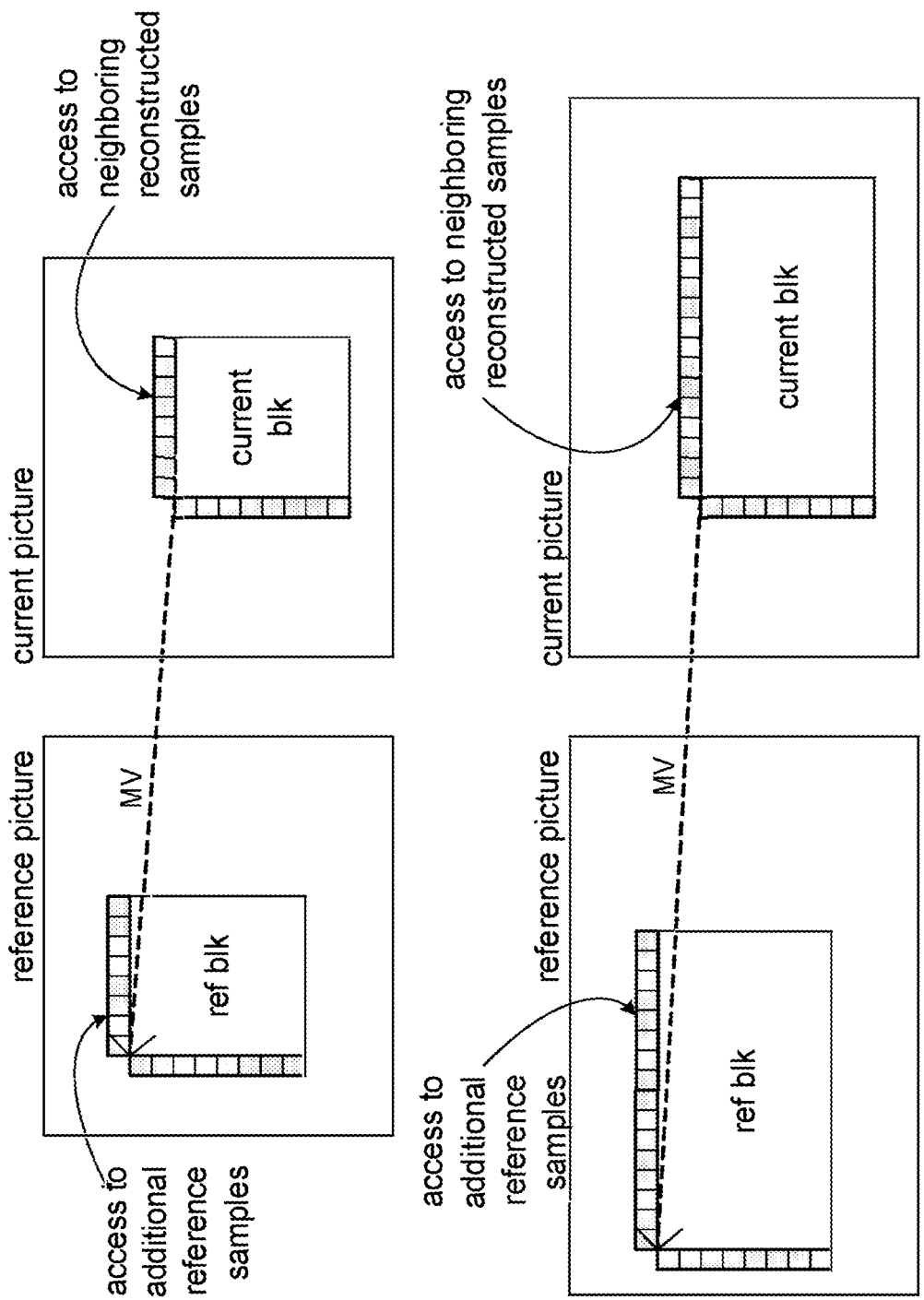
FIG. 6 illustrates neighboring samples of a current block and of a reference block that are used for local illumination compensation parameters determination.

According to a first non-limiting example, a Local Illumination Compensation (LIC) based on a linear model for example is used to compensate for illumination changes between a picture being encoded and its reference pictures, for example using a scaling factor α and an offset b. LIC may be enabled or disabled adaptively for each inter-mode coded coding unit (CU). When LIC applies for a CU, a mean square error (MSE) method may be employed for example to derive the parameters a and b by using the neighbouring samples of the current CU and their corresponding reference samples. FIG. 6 illustrates neighboring samples of a current block and of a reference block that are used for local illumination compensation (LIC) parameters determination. More specifically, the neighbouring samples of the CU (current blk) and the corresponding samples (identified by motion information MV of the current CU or sub-CU or ref blk) in the reference picture are used. The LIC parameters are derived and applied for each prediction direction or reference index separately. The LIC parameters may be determined by minimizing the mean square error difference (MSE) between the top, i.e.

samples located above the current CU, and left neighboring reconstructed samples rec_cur(r) of the current CU (access to neighboring reconstructed samples on the right of the figure) and the top and left neighboring reconstructed samples rec_ref(s) of their corresponding reference samples determined by the inter prediction (access to additional reference samples on the left of FIG. 1B), with s=r+MV, MV being a motion vector from inter prediction:

$$\text{dist} = \sum_{r \in V_{cur}, s \in V_{ref}} (\text{rec\_cur}(r) - a \cdot \text{rec\_ref}(s) - b)^2 \quad \text{(eq 1)}$$

where rec_cur(r) and rec ref(s) are co-located samples in the reconstructed and reference L-shape respectively.

The value of parameters (a,b) of the linear model may be obtained using different methods.

A first method uses a least square minimization:

$$a = \left( \frac{\sum ref(s) \times cur(r) - \frac{\sum ref(s) \times \sum cur(r)}{N}}{\sum cur(r)^2 - \frac{\sum ref(s) \times \sum ref(s)}{N}} \right) \quad \text{(eq 2)}$$

$$b = \frac{\Sigma cur(r)}{N} - a \times \frac{\Sigma ref(s)}{N}$$

The value of N, number of reference samples used in the derivation, is adjusted (reduced incrementally) in order to the sum terms in eq. 2 to remain below the maximum integer storage number value allowed (e.g. $N < 2^{16}$) or to cope with rectangular block.

A second method for obtaining the parameters (a, b) of the linear model is based on extreme values. It uses minimum and maximum reconstructed samples values of the L-shape to determine the slope "a". With this method, the value of "a" is obtained using the two reference samples (XA,XB) with minimal (Min) and maximal (Max) values and the associated reconstructed samples (YA,YB):

$$a = \frac{Y_B - Y_A}{X_B - X_A} \quad \text{(eq 2b)}$$

Then, once "a" is obtained, "b" can be determined as b=y mean−a*x mean (Eq 2b) for example, where (xmean; ymean) are the average of the reference and reconstructed samples respectively. In a variant of this method, the minimum and maximum values are replaced by the average of respectively the two smallest or the two greatest values. In another variant, more than two values are used to determine the average values.

Once the LIC parameters are obtained by the encoder or the decoder for the current CU, then the prediction pred (current_block) of current CU is determined as follows (uni-directional prediction case):

$$\text{pred(current\_block)} = a \times \text{ref\_block} + b \quad \text{(eq. 3)}$$

Where current_block is the current block to predict, pred(current_block) is the prediction of the current block, and ref_block is the reference block built with regular motion compensation (MV) process typically and used for the temporal prediction of the current block.

The set of neighboring reconstructed samples and the set of reference samples (gray samples in FIGS. 1B and 1C) have the same number and same pattern. In the following, we will denote "left samples" the set of neighboring reconstructed (or the set of reference samples) situated to the left of the current block and denote "top samples" the set of neighboring reconstructed (or the set of reference samples) located above the current block. We will denote "samples set" the one of "left samples" and "top-samples" sets. Preferably the "samples set" belongs to a left or top neighboring line of the block.

Figure 7:
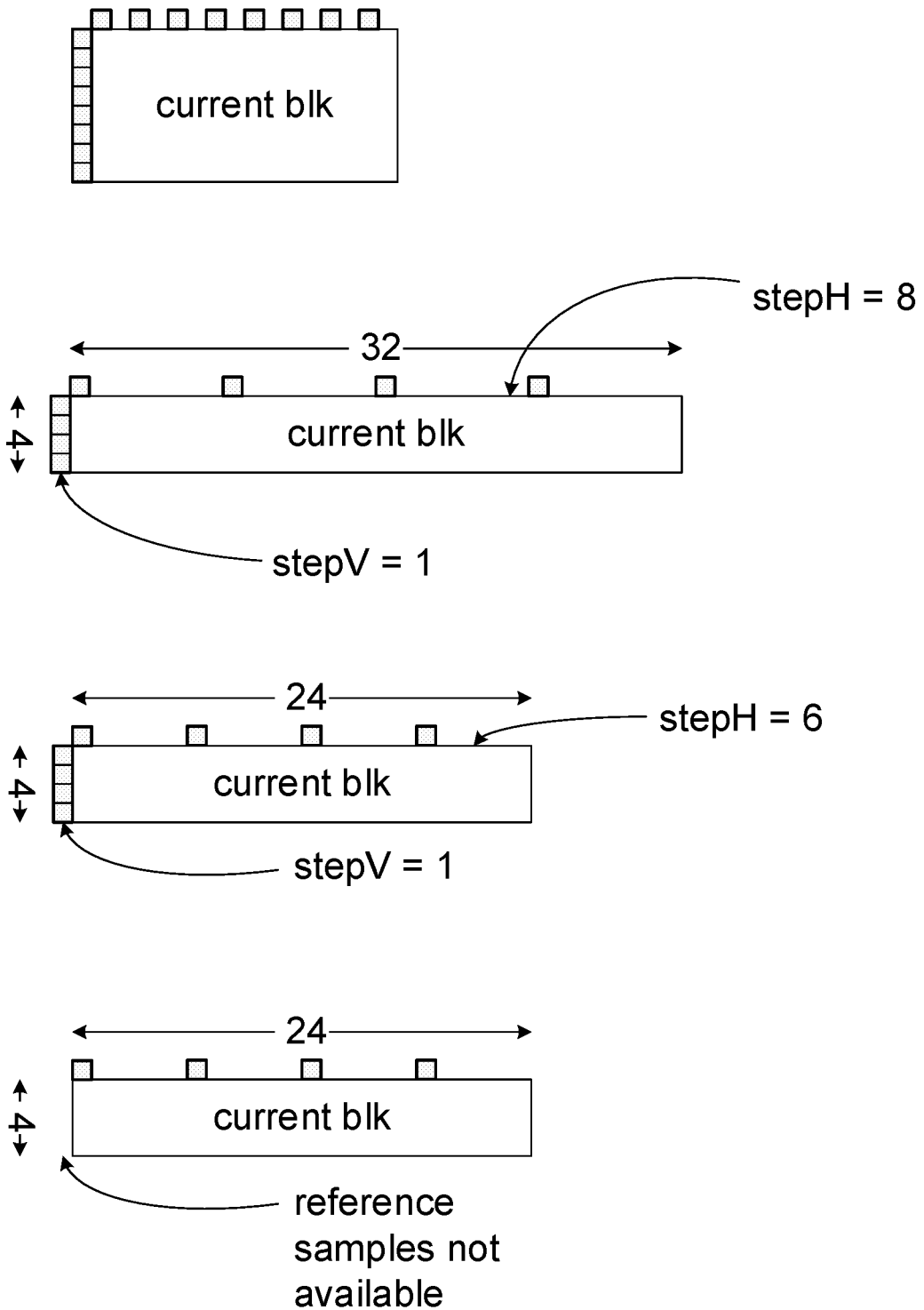
FIG. 7 illustrates illustrates examples of subsampling for reference samples.

FIG. 7 illustrates examples of subsampling for reference samples. Indeed, the reference samples can be sub-sampled (with a sub-sampling step of stepH or stepV, horizontally and/or vertically) prior to be used for deriving LIC parameters (a,b).

Figure 8A:
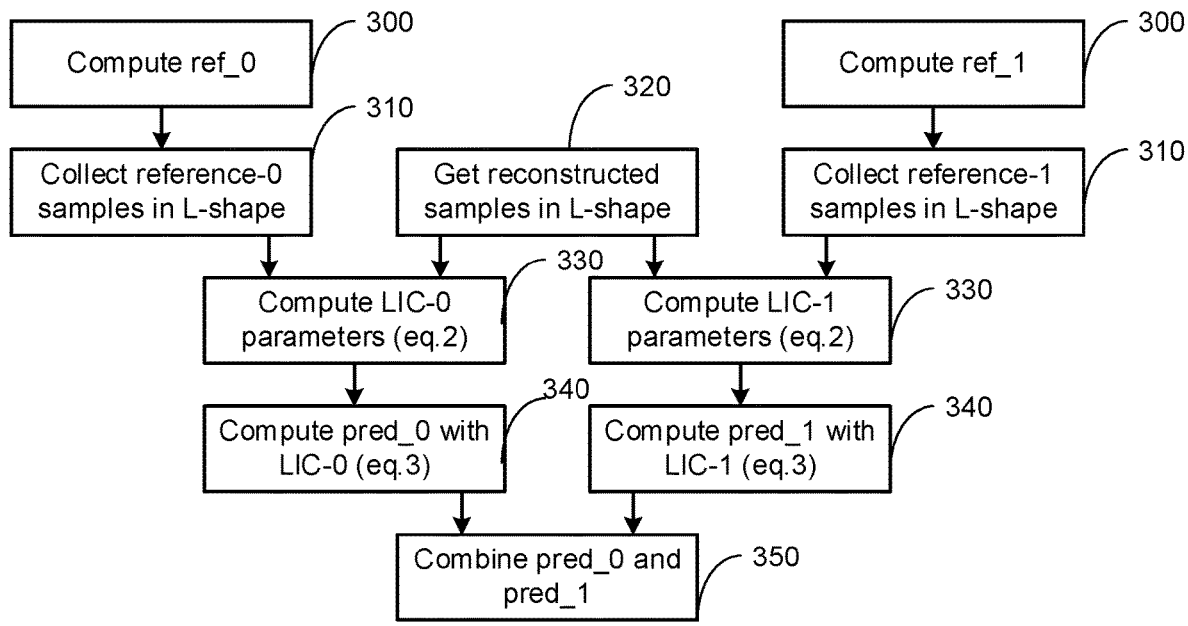
FIGS. 8A and 8B illustrate flowcharts of bi-prediction methods in case LIC applies.

FIG. 8A illustrates an example flowchart of bi-prediction methods in case LIC applies. In case of bi-prediction, the LIC process is applied twice (by applying steps 300, 310, 330 and 340 on both reference 0 and reference 1), first on reference 0 prediction (LIST-0) and second on the reference 1 prediction (LIST_1) (as illustrated on FIG. 3). Ref_0 is determined (300). Neighboring reference samples (310) and neighboring reconstructed samples (320) in L-shape are determined. First LIC parameters, LIC-0, are determined from these neighboring reference and reconstructed samples. A first prediction pred_0 is determined using LIC-0 parameters (340). The same steps apply for reference 1.

Next, the two predictions are combined (350) together as usual using default weighting (P=(P0+P1+1)>>1) or bi-prediction weighted averaged (BPWA): P=(g0.P0+g1.P1+(1<<(s−1)))>>s). This method is called method-a.

Figure 8B:
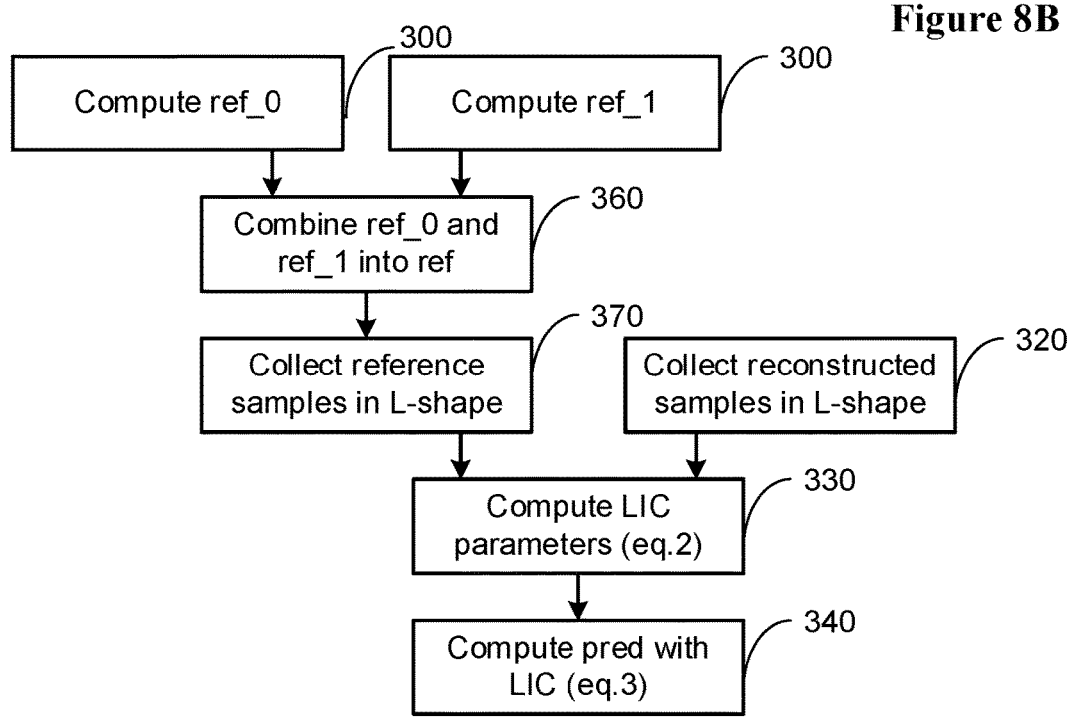

FIG. 8B illustrates a second example flowchart of bi-prediction methods in case LIC applies. In this variant named method-b, in case of bi-prediction, the regular predictions are first combined (360) into a single reference ref. Neighboring reference samples (370) and neighboring reconstructed samples (320) in L-shape are determined. Next one single LIC process (330, 340) is applied as depicted on FIG. 4.

In another variant (method-c based on method-b), in case of bi-prediction, the LIC-0 and LIC-1 parameters are derived directly as follows:

$$\text{dist}=\Sigma_{r\in V_{cur}, s\in V_{ref}}(\text{rec\_cur}(r)-a0.\text{rec\_ref}(s)-a1.\text{rec\_refl}(s)-b)^2 \quad \text{(eq. 2b)}$$

Let's call NL and NT the number of selected reference/reconstructed samples in the L-shape situated to the left of the current block and above the current block respectively. In order to follow at least one restriction mentioned below (R1 to R3), one has NL≤cuHeight and NT ≤cuWidth. Some restrictions apply in the choice of the left and top samples (gray samples in FIG. 6) used to derive the LIC parameters:

R1) The sum of left and top samples number is a power of 2 so that the division in eq. 2 can be implemented using right shifting.
R2) The number of left (NL) and top (NT) samples is the same and is equal to NS (so that N=2×NS):

$$n=\min(\text{cuHeight}, \text{cuWidth})$$

$$x=\log 2(n)$$

$$NS=2^x \quad \text{(eq.4)}$$

R3) The step in between left (stepV) or top (stepH) samples is equal to:

$$\text{stepV}=\text{cuHeight}>>\log 2(NS)$$

$$\text{stepH}=\text{cuWidth}>>\log 2(NS) \quad \text{(eq. 5)}$$

However, while LIC allows to improve the reconstruction, it induces additional complexity and memory bandwidth in certain situations.

Embodiments described hereafter have been designed with the foregoing in mind.

At least one embodiment proposes new ways of selecting reference/reconstructed samples used to derive the LIC parameters appropriately in order to respect additional restrictions (e.g. not using intra predicted reconstructed samples). One purpose of these limitations is to reduce LIC processing pipeline complexity and memory bandwidth by disallowing the usage of reconstructed samples which have been coded with one set (SM) of determined modes (e.g. intra mode) and/or with one set of parameters (SP) values (e.g. a given QP value or bi-predicted block with non-default BPWA weights).

At least one embodiment modifies the selection of the reconstructed and/or reference samples used to compute the local illumination compensation (LIC) parameters. When some (reconstructed) samples values are not available for LIC parameters' determination, e.g. because they belong to an intra coded block or to a block coded with a mode of the set SM, it is proposed to replace them with other values.

For example, the set SM of modes may be composed of intra coded blocks, combined intra-inter prediction (CIIP, also known as multi-hypothesis) and intra block copy (IBC).

Such tools induce some constraints to the processing pipeline and reduce the efficiency of the pipeline since, for the reconstruction of a current block, it requires to wait until neighboring blocks are reconstructed. In the following, a reference sample is said or marked as "valid" if it belongs to the L-shape and if it is co-located with a reconstructed sample which has not been coded with a SM mode or SP parameter value. In other words, "valid" samples are samples that are already available and can be used directly, without slowing down the processing pipeline to wait for its availability. In other cases, it will be considered or marked as "not-valid". Such samples would require waiting for their availability and thus will not be used so that the processing pipeline is not slowed down.

Note that this restriction concerns the reconstructed samples only but not the reference samples. This is exploited in embodiments of FIGS. 17A, 17B, 17C.

Figure 9:
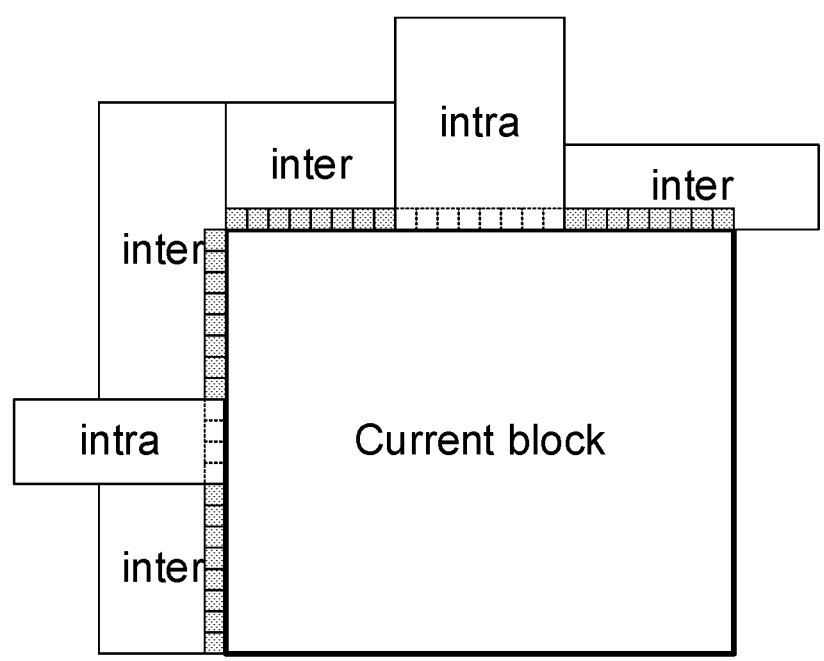
FIG. 9 depicts a current block and reconstructed neighboring samples located to the left and above the current block.

FIG. 9 depicts a current block and reconstructed neighboring samples located to the left and above the current block. In the present application, to simplify the text and figures, the description will be based on the example of this figure where one considers as "valid" a reconstructed sample encoded with "inter" mode and "not-valid" the reconstructed samples encoded with "intra" mode, according to the pipeline constraints described above. The term "missing samples" will be used also to represent the reconstructed samples marked as "not-valid" which would have been used for LIC parameter calculation if they had been marked as "valid".

In this application, multiple embodiments are related to defining the number of samples N to be used for LIC parameters computation and optionally replacing the number of missing samples with "valid" ones. Several methods are disclosed to replace "missing samples" with "valid samples": Padding, Interpolation, Copy, Default.

Figure 10:
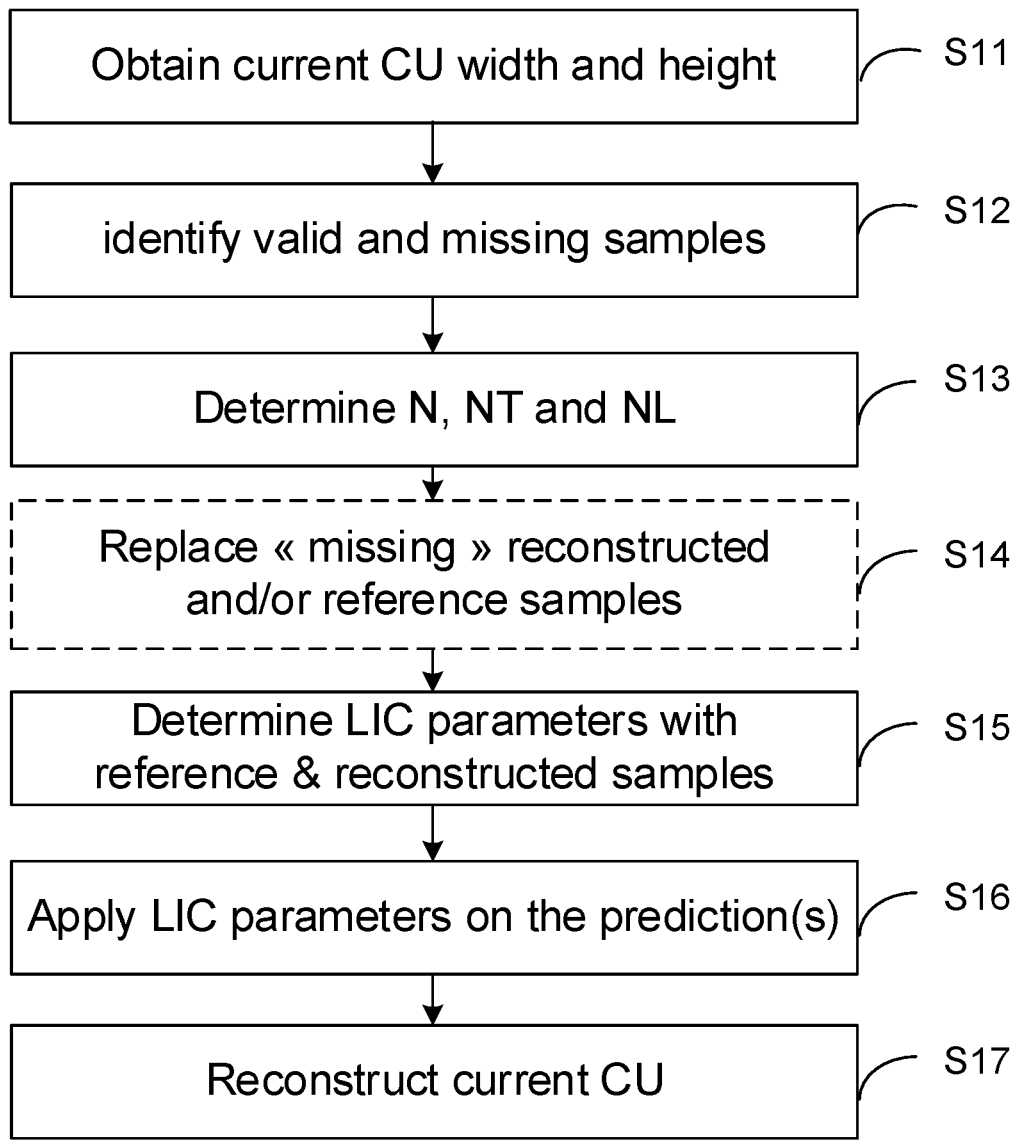
FIG. 10 depicts a flowchart of a method for block reconstruction according to one embodiment.

FIG. 10 is a flowchart of a method for reconstructing a current block according to one embodiment. The method applies both to an encoding method/apparatus and to a decoding method/apparatus.

A height and width of a coding unit (CU) are obtained (S11). Valid and missing samples are determined (S12). N, NT and NL values are determined (S13). Optionally, missing samples are replaced by other samples (S14). LIC parameters are determined, e.g. based on equation (2) or (2b), using the reference and reconstructed samples (S15) optionally replaced if missing. The LIC parameters are applied on the prediction of current block (S16), e.g. using equation (3). The current CU is reconstructed using the prediction after LIC (S17).

The missing samples replacement (S14) is optional since another technique considers using a number of samples for LIC parameters computation that is a power of 2. This considerably simplifies further computations and particularly since computations do not require arbitrary divisions anymore and benefit from cost-effective $2^k$-based divisions. When determining the number of values to be used, particular care may be applied to respect such number of elements.

Figure 11:
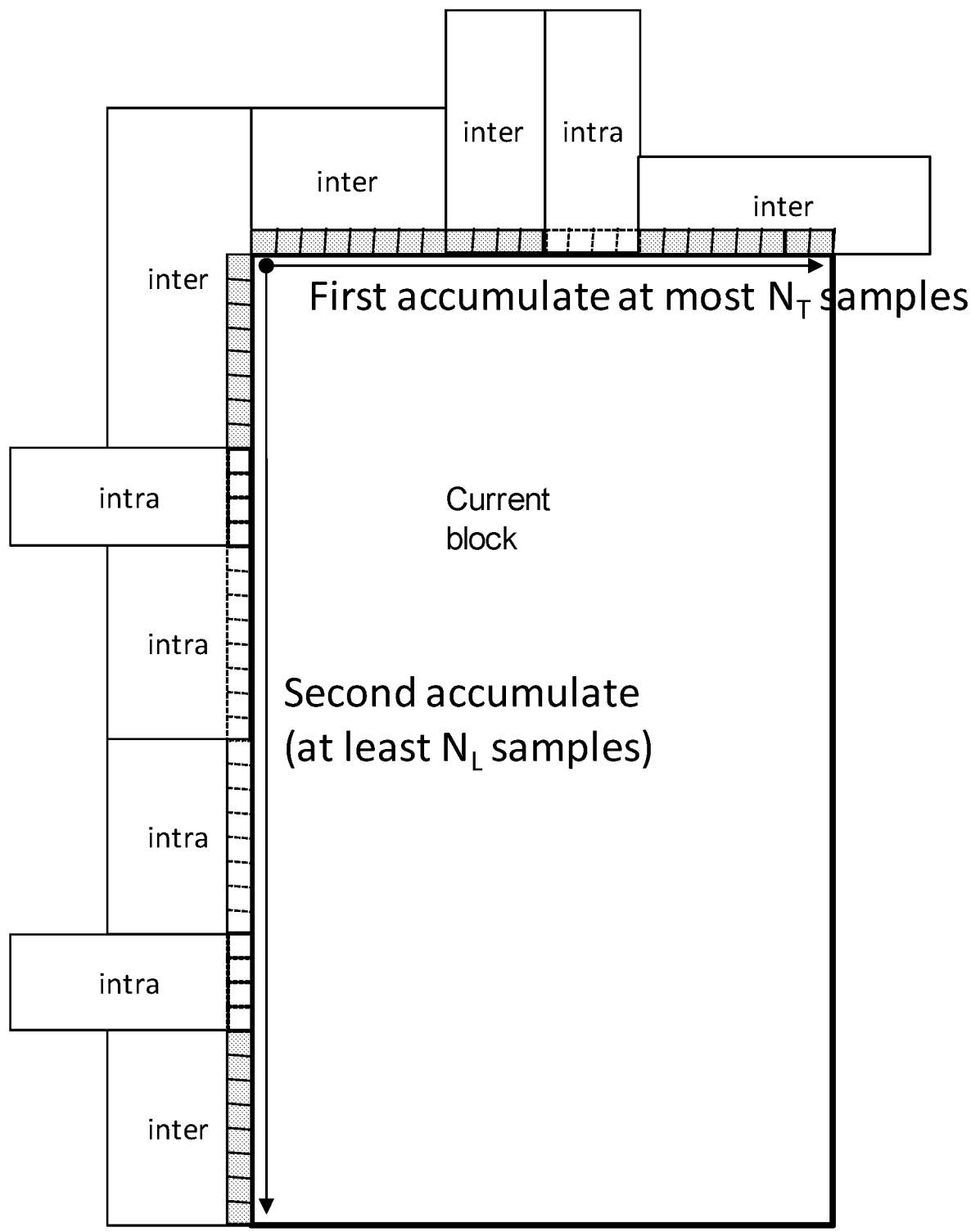
FIGS. 11-21 illustrate various embodiments for determining appropriate samples to be used for local illumination compensation.

FIG. 11 illustrates an example embodiment comprising a balanced collection of the reference samples so that NL+NT=$2^k$. In this example embodiment, the collection of reference samples is balanced within the top and left elements of the L-shape so that the total number of elements is a power of 2. For that, in step S13 of FIG. 10, NM valid samples are collected from the L-shape both on top and on left elements. A number of elements N=$2^k$ is chosen so that so that $2^k \leq NM < 2^{k+1}$. Then the N elements are selected from the valid samples in order to balance NL and NT coherently with block dimensions (for example, use more elements for the left if the height of the block is larger than its width). In at least one embodiment, the top samples are selected first, but only at most NT samples with NT=N−NL and NL=Min (numValidleft, minToUseLeft) where, when the height of the block is smaller than its width: minToUseLeft=N×cuHeight/(cuWidth+1), or minToUseLeft=N/2 otherwise. In at least one variant embodiment, the balancing is performed proportionally to the ratio between the height and the width of the block. In at least one variant embodiment, the balancing is performed proportionally to the ratio between the number of valid samples on the left and the number of valid samples on the top.

Figure 12:
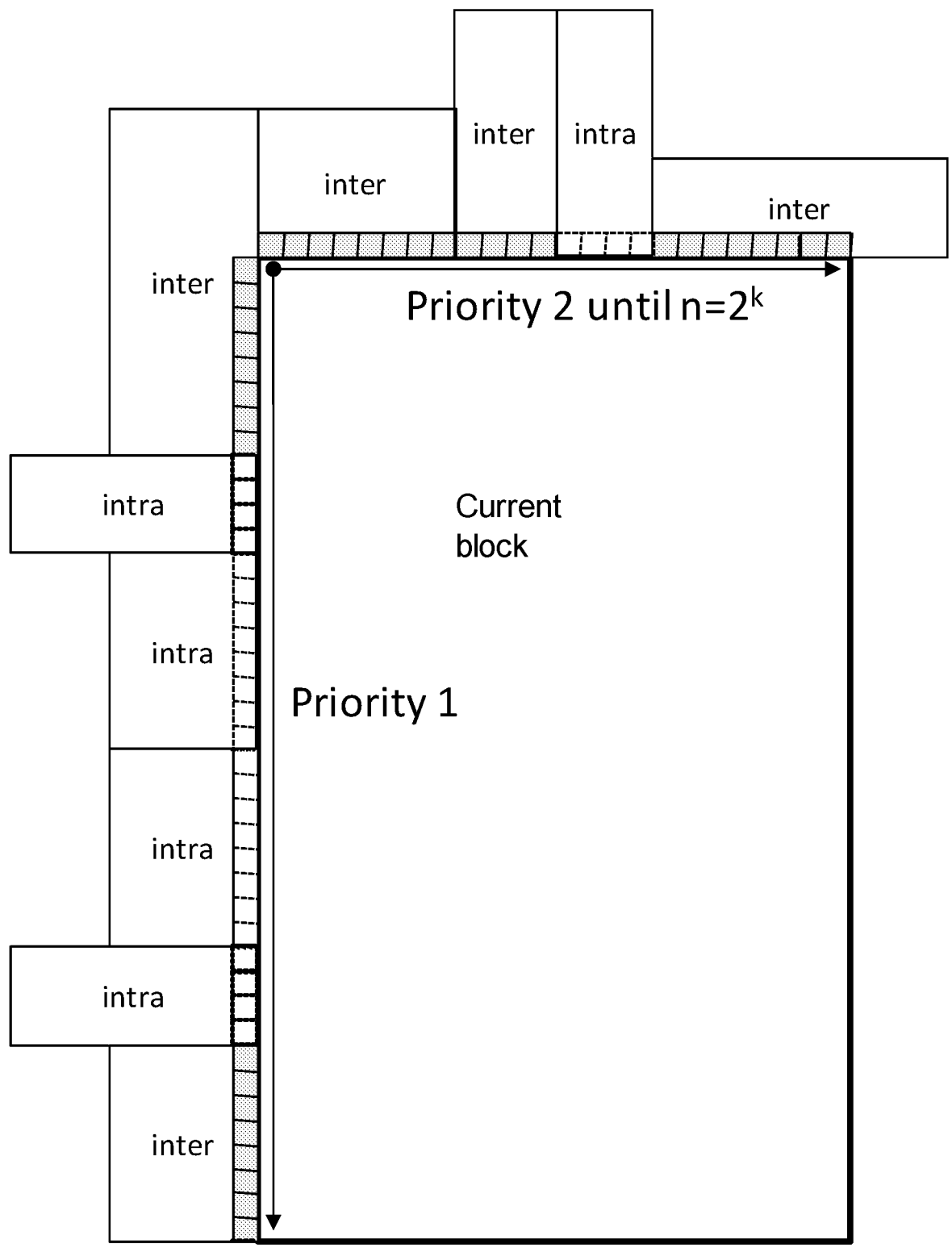

FIG. 12 illustrates an example embodiment where the largest side collection of the reference samples is favored so that NL+NT=$2^k$. In this embodiment, the collection of reference samples is balanced within the top and left elements of the L-shape so that the total number of elements is a power of 2 like for previous embodiment with the difference that the largest side is favored. In such embodiment, in step S13 of FIG. 10, the number of valid samples NM is first counted and N=$2^k$ is chosen so that so that $2^k \leq NM < 2^{k+1}$. When the block height is greater than or equal to the block width (cuHeight>=cuWidth), collect the valid left samples and use valid top samples to complete the set of samples. In other words, NL=number of valid left samples and NT=N−NL. Otherwise, when the block height is small than the block width (cuHeight<cuWidth), collect the valid top samples and use valid left samples to complete the set of samples. In other words, NT=number of valid top samples and NL=N−NT.

In a variant of this embodiment, the side favored is not the one that is the greatest but the one that has the most valid samples. In other words, NT and NL are compared together. When NT>NL, all valid sample from the top are selected first and completed with samples from the left. When NT<NL, all valid sample from the left are selected first and completed with samples from the top.

Figure 13A:
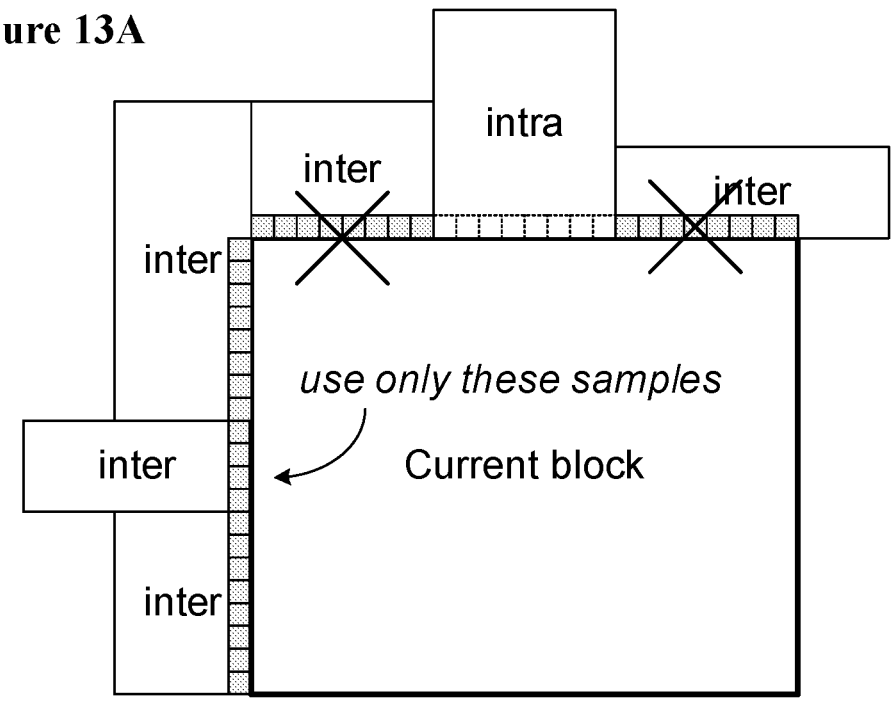
Figure 13B:
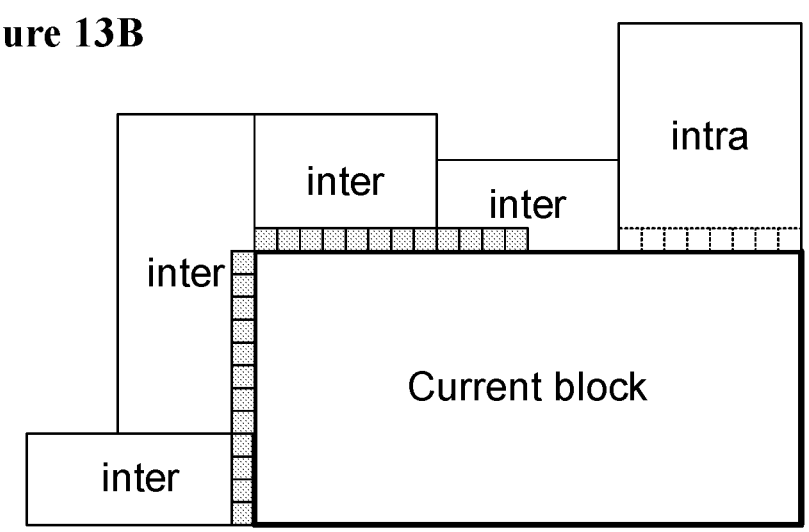

FIGS. 13A and 13B illustrate example embodiments where samples are collected from one border with "valid" samples. The principle here is that if the reconstructed left (or top) samples are "valid" but some reconstructed top (or left) samples are "not-valid", then use only left (or top respectively) samples to compute LIC parameters. As illustrated in FIG. 13a, some reconstructed top samples are "not-valid" because they belong to an intra coded block while reconstructed left are "valid". Therefore, only reconstructed left samples are used for determining the LIC parameters in S15 of FIG. 10. In a variant depicted in FIG. 13b, one uses the first NS left and the first NS top samples if they are all marked as "valid".

FIGS. 13C and 13D illustrate example embodiments where samples are collected from one border with "valid" samples. In variant embodiment, one uses the last NS left and/or the last NS top samples if they are all marked as "valid" as illustrated in the figures.

In a variant, NS is redefined and computed as NS=$2^k$ here k is determined as the greater integer so that NS<=$2^k$.

Figure 14A:
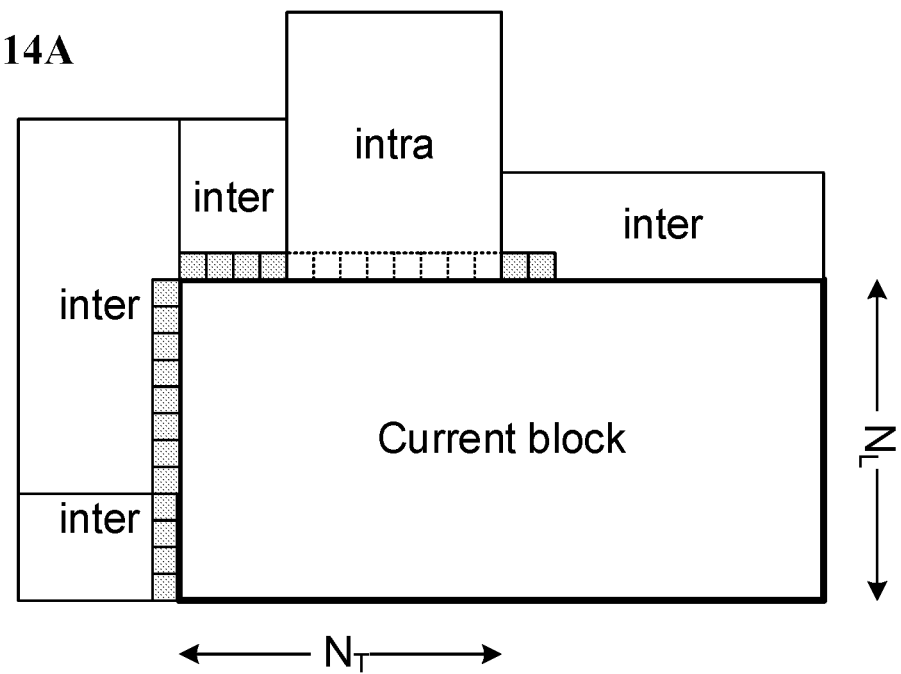
Figure 14B:
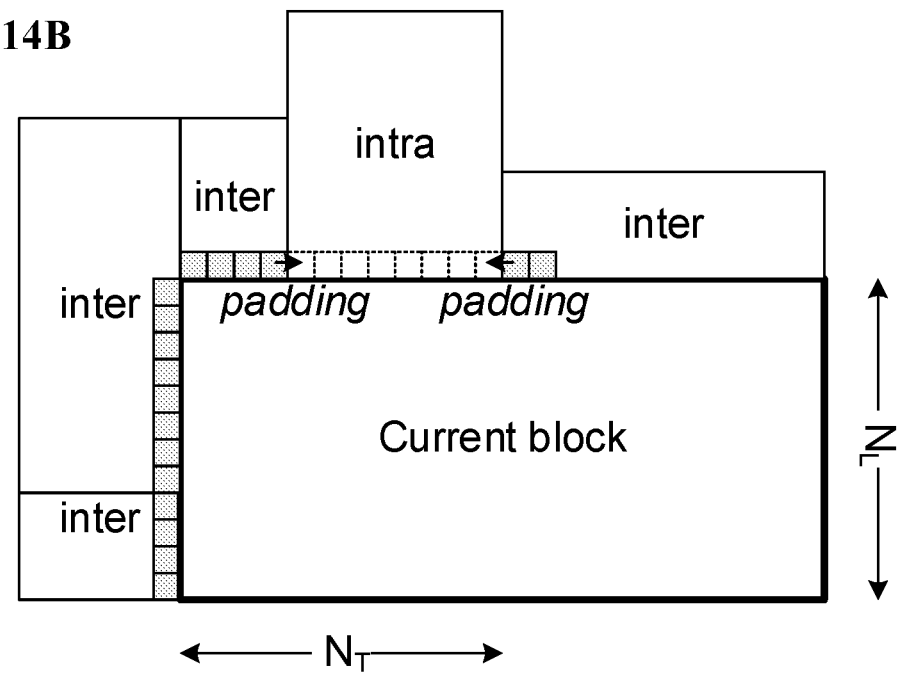

FIGS. 14A and 14B illustrate an example embodiment using padding. In this embodiment, all the reference samples are collected so that R2 is still verified (NL=NT=NS): one collects up to NS "valid" samples in each direction (left and top) as depicted on FIG. 14A. If in one direction X (X=L or T), NX<NS, then missing samples are replaced with padding for example. In FIG. 14B, there are missing samples to the top of the current block which are padded. "Padding" means that reference and reconstructed neighboring samples are replaced with "valid" samples. Advantageously, the choice of padded "valid" samples is made using one or several of the following rules:

use "valid" samples located on the same direction X, i.e. a missing sample located to the left of the current block is replaced by a "valid" sample to the left of the current block and a missing sample located to the top of the current block is replaced by a "valid" sample to the top of the current block.

replace one missing sample with the "valid" samples which is spatially the closest to the replaced sample.

In a variant embodiment, if there are valid samples to the left and to the right of missing samples then half of the missing samples are padded from the left and the other half from the right as shown in FIG. 14B. If only one side has valid samples, only this side is used for padding. If there are no valid samples, a default value is used for padding.

Figure 15:
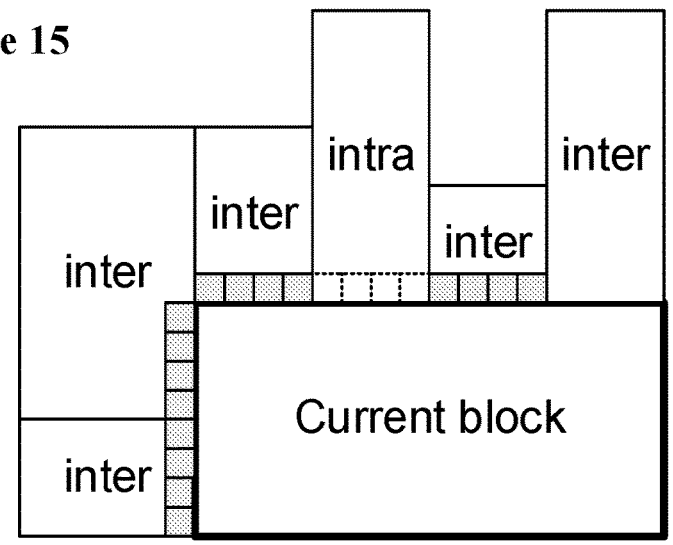

FIG. 15 illustrates an example embodiment where all the reference samples are collected so that NL+NT=$2^k$. In this embodiment called Increase-NS, one collects all (NM) top and left valid samples. One uses N<NM samples among the NM "valid", with N=$2^k$ (320) and k chosen so that $2^k \leq NM < 2^{k+1}$.

Figure 16:
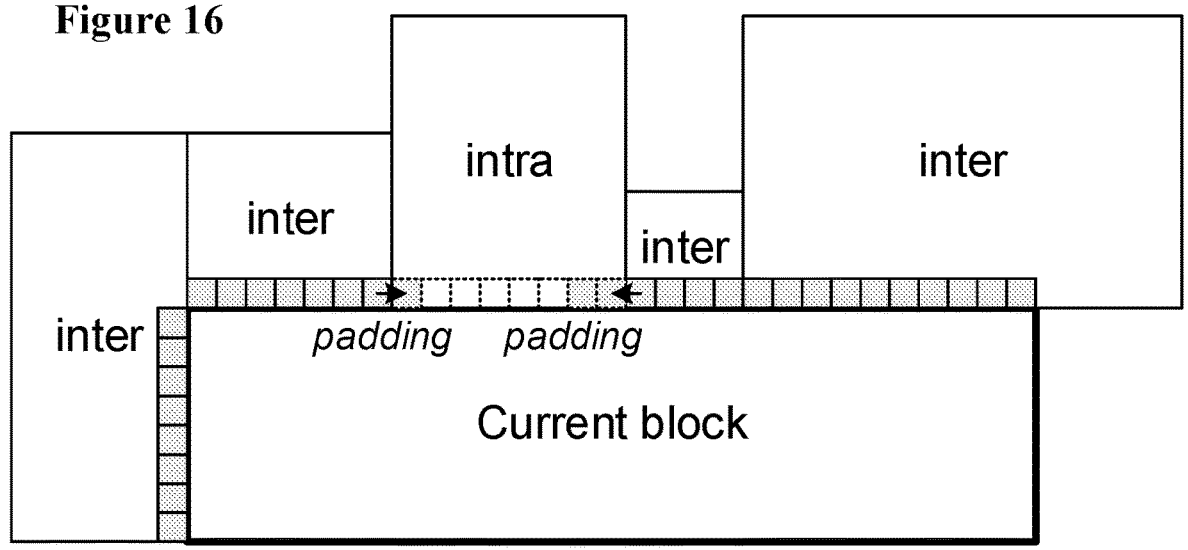

FIG. 16 illustrates an example embodiment combining former embodiments. In this embodiment, all the reference samples are collected so that NL+NT=$2^k$ as follows: One collects all (NM) top and left valid samples. One computes k so that $2^k \leq NM \leq 2^{k+1}$. The choice of N is made as follows:

if (NM−$2^k$)<T:N=$2^k$ (same as embodiment of FIG. 7)

else N=$2^{k+1}$ and missing samples are replaced with padding where "T" is determined a-priori. In the example depicted in the figure, NM=29 then k=4 ($2^k$=16). In case T=4, then (NM−$2^k$) is superior to T, then N is set to $2^{k+1}$=32 and (32−29)=3 missing are replaced with padding for example.

In a variant, T is a function of "k" (e.g. T(k)=$2^{k-1}$).

Figure 17A:
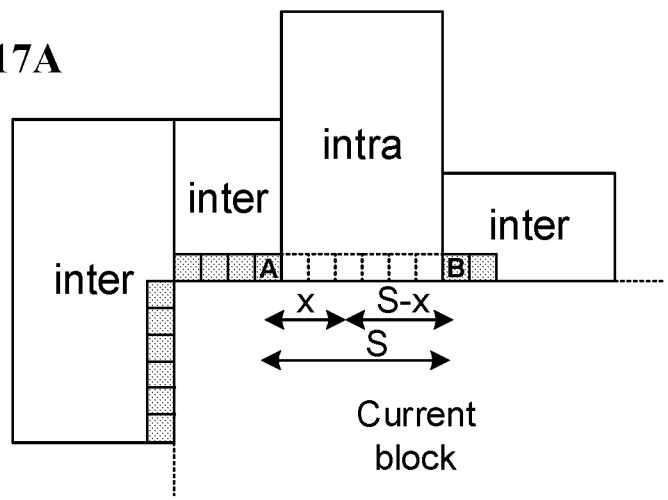
Figure 17B:
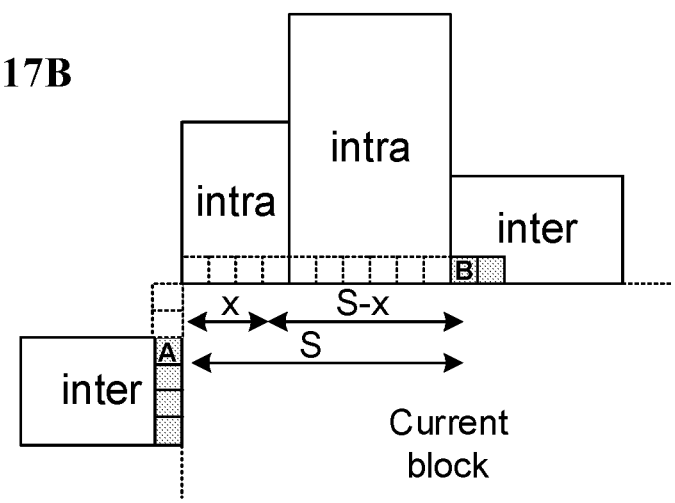
Figure 17C:
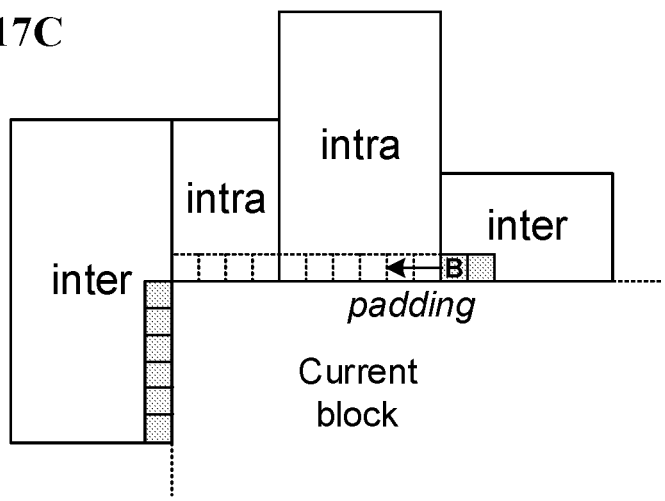

FIGS. 17A, 17B, 17C illustrate example embodiments using padding with interpolation. In some embodiments, missing samples are replaced by an interpolation value t(x) instead of being padded. The value t(x) is obtained by interpolation between two sample values (A,B), where (A,B) are the closest "valid" samples in the same direction (as depicted in FIG. 11A):

$$t(x)=(x.B+(S-x).A)/s$$

where: S is the size of missing samples,

A,B are the closest reference or reconstructed sample values to the left or to the right of the set of missing samples (or to the top or bottom respectively in vertical direction), x is the distance of sample to interpolate to its closer left sample.

Vertical sample values are interpolated identically.

In a variant, A or B can be on different direction (FIG. 17B). In a variant, in case A (or B) is not available in the same direction, interpolation can be replaced with padding (FIG. 17C).

Figure 18A:
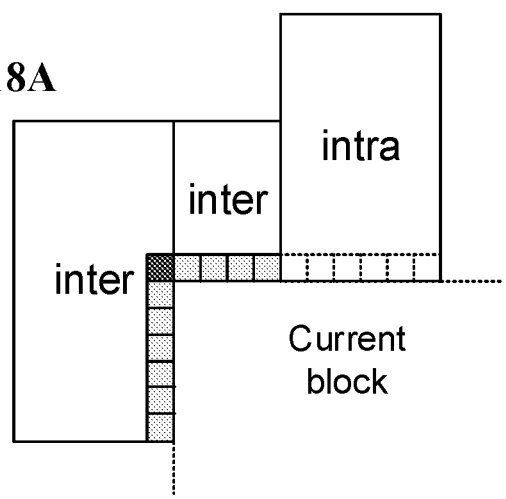
Figure 18B:
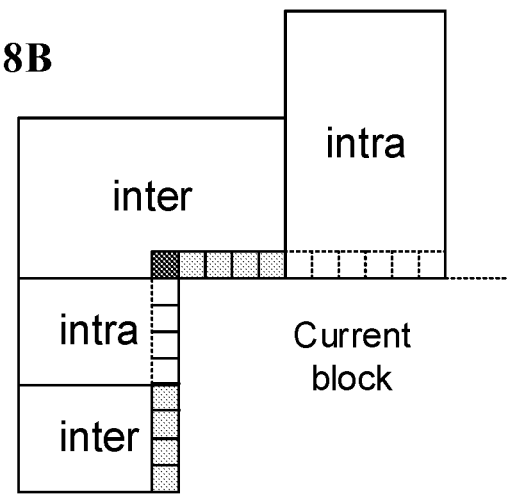
Figure 18C:
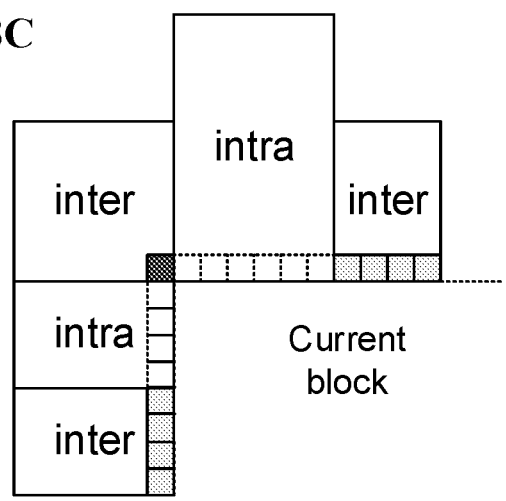

FIGS. 18A, 18B and 18C illustrate example embodiments where one more corner reference sample is added when available/necessary. In one embodiment, one additional reference/reconstructed top-left sample is used if it is "valid" (black sample in FIG. 18A). In a variant, the top-left sample is added to the list of samples used to compute LIC parameters if there are missing samples only. In another variant, the top-left sample is added to the list of samples used to compute LIC parameters if there are no valid samples to the left (or top) of the set of missing samples only (FIGS. 18B and 18C).

Figure 19A:
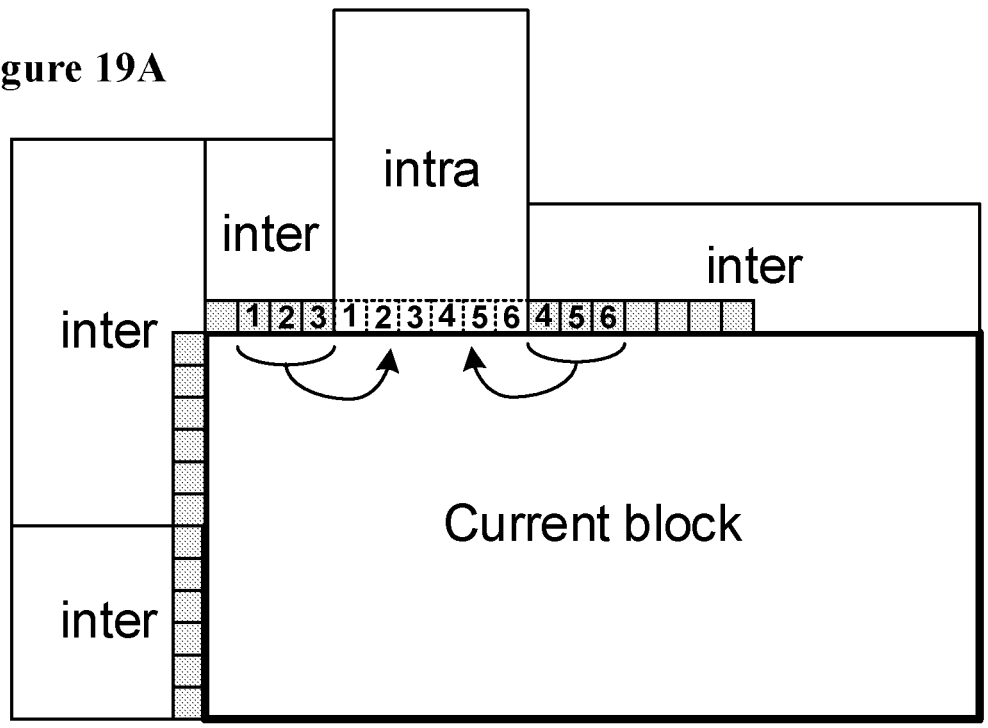
Figure 19B:
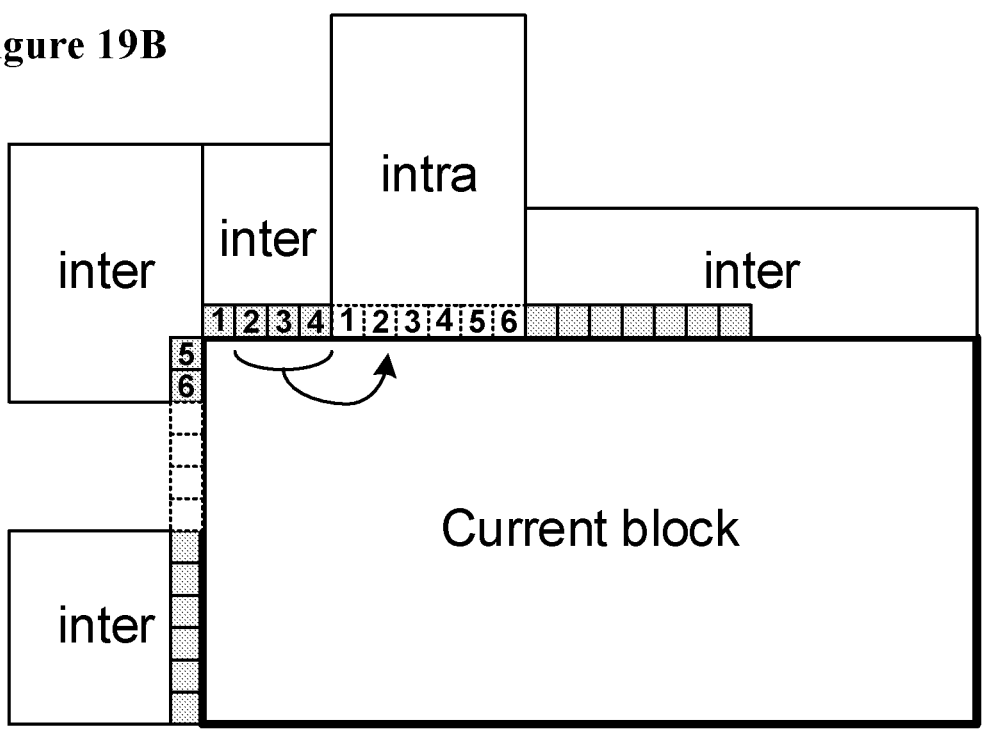
Figure 19C:
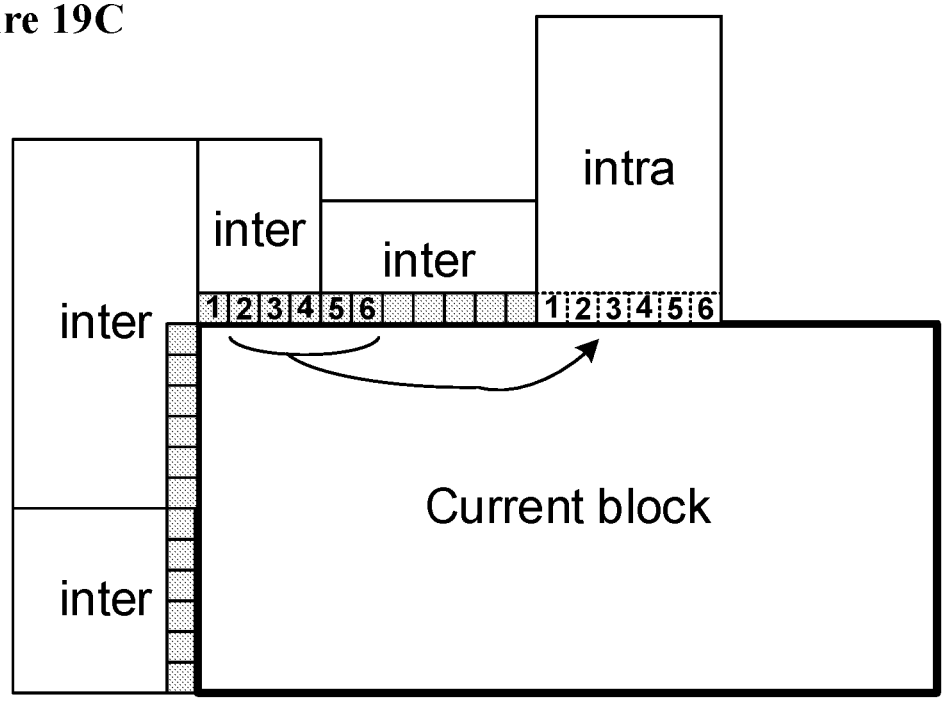
Figure 19D:
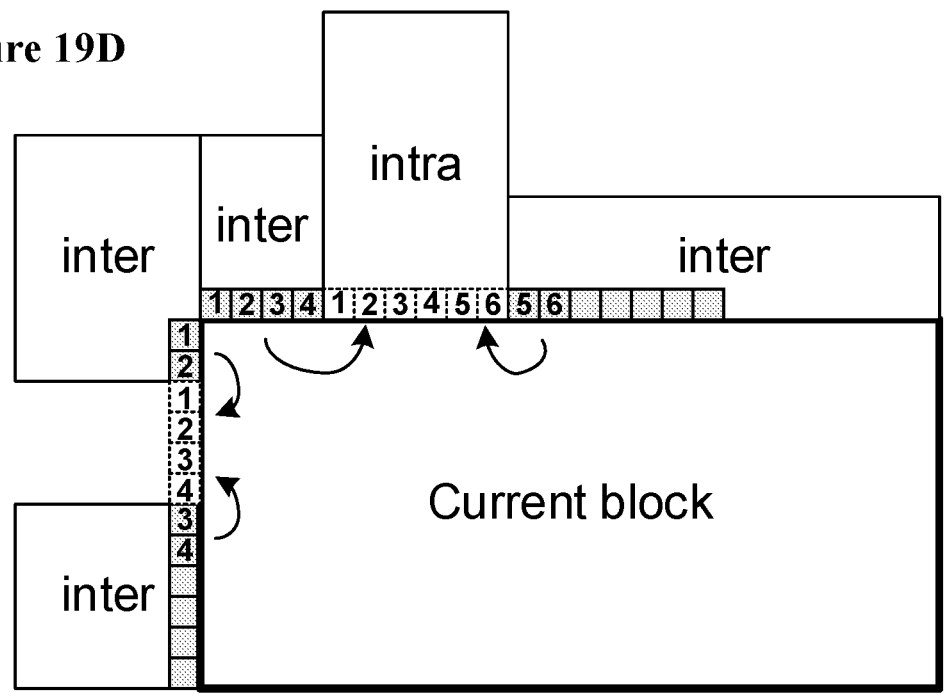

FIGS. 19A, 19B, 19C and 19D illustrate example embodiments where missing samples are replaced with "valid" samples copy. In one embodiment illustrated in FIG. 19A, the missing samples are replaced with consecutive "valid" samples sets. In a variant embodiment, the "valid" samples are copied from the set of "valid" samples. In a variant embodiment, the copied "valid" samples are collected starting from the location which is closest to the top-left L-shape sample preferably (FIG. 19B). In a variant embodiment, the "valid" samples are copied from the set of "valid" samples starting from the location which is closest to the top-left L-shape sample in the same direction (FIG. 19C, FIG. 19D). In a variant, if there are valid samples to the left and to the right of missing samples then half of the missing samples are copied from the left and the other half from the right (FIG. 19A). If only one side has valid samples, only this side is used for copy (FIG. 19C).

Figure 20:
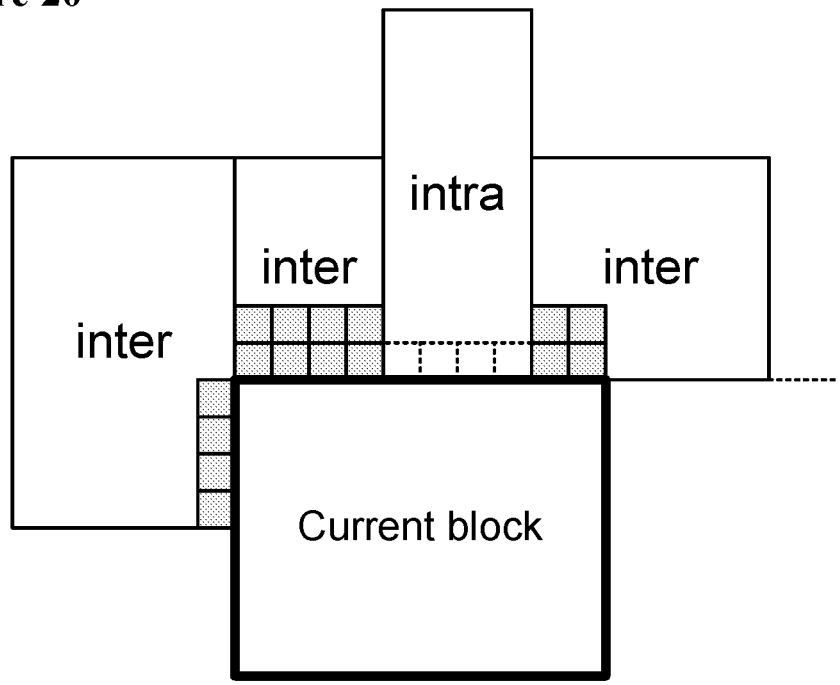

FIG. 20 illustrates an example embodiment where missing samples are replaced with "valid" samples obtained from additional L-shape line.

Figure 21:
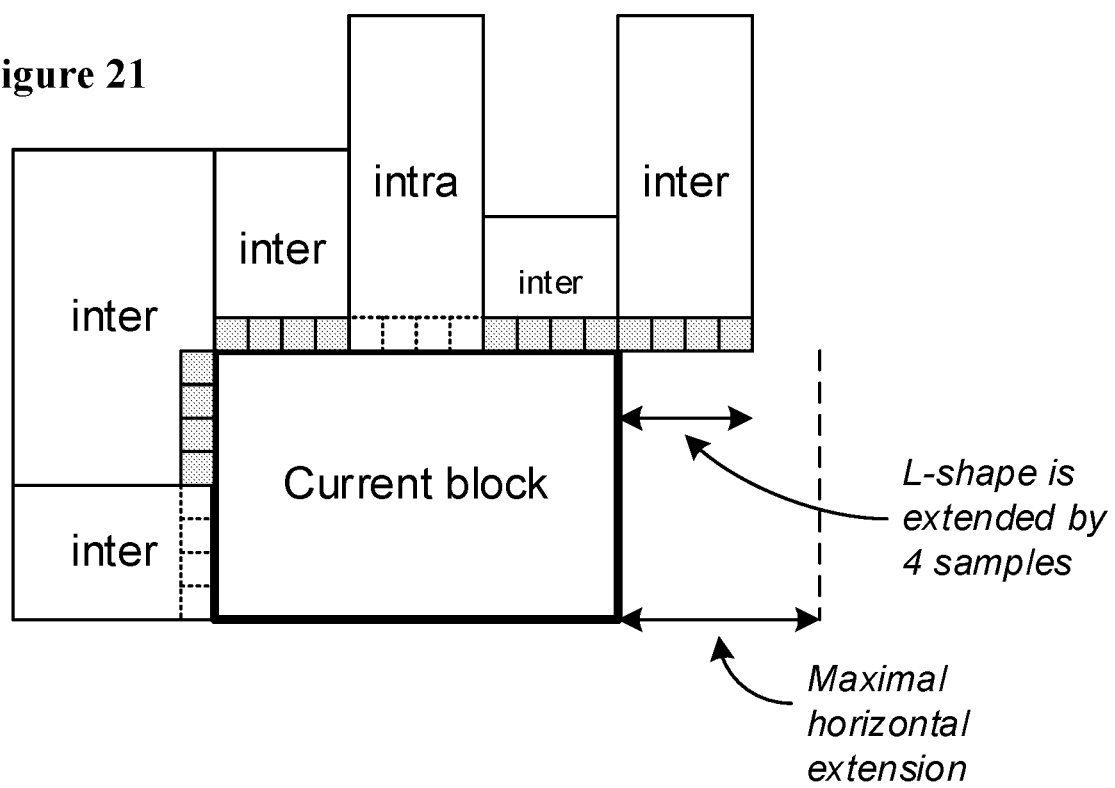

FIG. 21 illustrates an example embodiment where the L-shape is extended beyond current block size. The L-shape is extended in one or both direction beyond the current block. In a variant, the extension is carried out in case of "missing" samples only. In the example depicted in this figure, the extension allows to use N=16 reference samples. The L-shape extension can be limited by a value which can be a function of the current block size value. For example, in the example of FIG. 21, the maximal extension is equal to cuWidth/2 horizontally.

An example embodiment proposes to use the average of 2 sub-models. First accumulate samples from top and left independently. Use padding or copy as described in one of the former embodiment or using only valid samples, but using NL and NT being power of 2 ($2^k \leq NL < 2^{k+1}$ and $2^P \leq NT < 2^{P+1}$), and when performing the least square minimization of eq.2 for determining the parameters (a, b) of the linear model, divide top and left accumulations by NT and NT respectively (which are power of two) and obtain the final accumulations as an average of the top and left sub-accumulations. For example, compute the average of reference and reconstructed samples as the mean of top average and left average. Each top and left average being computed separately. This leverages the problem of finding a power of two when the block is not square but rectangular and all the reconstructed samples are valid.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The aspects described and contemplated in this application can be implemented in many different forms. FIGS. 1, 2 and 3 provide some embodiments, but other embodiments are contemplated and the discussion of these figures does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the motion compensation and motion estimation modules (170, 175, 275), of a video encoder 100 and decoder 200 as shown in FIG. 1 and FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, NS=4. The specific values are for example purposes and the aspects described are not limited to these specific values.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, adapting the illumination compensation process.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example—a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of an illumination compensation parameter. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter.

By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types.

The invention claimed is:

1. A method of decoding a block of samples of a picture of a video, the method comprising:
   determining, for the block of samples, from a set of neighboring reconstructed samples, a set of N valid samples, N being an integer, wherein a neighboring reconstructed sample is considered as a valid sample on the condition that the sample has not been coded with a mode amongst a set of coding modes and/or with a parameter amongst a set of parameters values, wherein determining the set of N valid samples comprises:
      when a block height is greater than or equal to a block width or a number of valid neighboring samples at a left of the block is greater than or equal to a number of valid neighboring samples at a top of the block, first adding all valid neighboring samples at the left of the block in the set of N valid samples and adding valid neighboring samples at the top of the block only to complete the set up to N valid samples; and
      when the block height is smaller than the block width or the number of valid neighboring samples at the left of the block is smaller than the number of valid neighboring samples at the top of the block, first adding all valid neighboring samples at the top of the block in the set of N valid samples and adding valid neighboring samples at the left of the block only to complete the set up to N valid samples;
   determining local illumination compensation parameters from the determined set of N valid samples and corresponding reference samples in a reference block; and
   reconstructing the block from a prediction block obtained by applying local illumination compensation with the determined parameters on the reference block.

2. The method of claim 1, wherein the set of coding modes comprises at least one of intra prediction, combined intra-inter prediction, or intra block copy, and the set of parameters values comprises a given quantization parameters value or the coding mode is bi-prediction with non-default bi-prediction weighted averaged weights parameter.

3. The method of claim 1, wherein N is a power of 2.

4. A non-transitory processor-readable medium comprising instructions for performing the method of claim 1, when executed by one of more processors.

5. A video decoding apparatus comprising a processor configured to:
   determine, for a block of samples of a picture of a video, from a set of neighboring reconstructed samples, a set of N valid samples, N being an integer, wherein a neighboring reconstructed sample is considered as a valid sample on the condition that the sample has not been coded with a mode amongst a set of coding modes and/or with a parameter amongst a set of parameters values, wherein to determine the set of N valid samples comprises:
      when a block height is greater than or equal to a block width or a number of valid neighboring samples at a left of the block is greater than or equal to a number of valid neighboring samples at a top of the block, first adding all valid neighboring samples at the left of the block in the set of N valid samples and adding valid neighboring samples at the top of the block only to complete the set up to N valid samples; and
      when the block height is smaller than the block width or the number of valid neighboring samples at the left of the block is smaller than the number of valid neighboring samples at the top of the block, first adding all valid neighboring samples at the top of the block in the set of N valid samples and adding valid neighboring samples at the left of the block only to complete the set up to N valid samples;
   determine local illumination compensation parameters from the determined set of N valid samples and corresponding reference samples in a reference block; and
   reconstruct the block from a prediction block obtained by applying local illumination compensation with the determined parameters on the reference block.

6. The video decoding apparatus of claim 5, wherein the set of coding modes comprises at least one of intra prediction, combined intra-inter prediction, or intra block copy, and the set of parameters values comprises a given quantization parameters value or the coding mode is bi-prediction with non-default bi-prediction weighted averaged weights parameter.

7. The video decoding apparatus of claim 5, N is a power of 2.

8. A method of encoding a block of samples of a picture of a video, the method comprising:
   determining, for the block of samples, from a set of neighboring reconstructed samples, a set of N valid samples, N being an integer, wherein a neighboring reconstructed sample is considered as a valid sample on the condition that the sample has not been coded with a mode amongst a set of coding modes and/or with a parameter amongst a set of parameters values, wherein determining the set of N valid samples comprises:
      when a block height is greater than or equal to a block width or a number of valid neighboring samples at a left of the block is greater than or equal to a number of valid neighboring samples at a top of the block, first adding all valid neighboring samples at the left of the block in the set of N valid samples and adding valid neighboring samples at the top of the block only to complete the set up to N valid samples; and
      when the block height is smaller than the block width or the number of valid neighboring samples at the left of the block is smaller than the number of valid neighboring samples at the top of the block, first adding all valid neighboring samples at the top of the block in the set of N valid samples and adding valid neighboring samples at the left of the block only to complete the set up to N valid samples;

determining local illumination compensation parameters from the determined set of N valid samples and corresponding reference samples in a reference block; and encoding the block from a prediction block obtained by applying local illumination compensation with the determined parameters on the reference block.

9. The method of claim 8, wherein the set of coding modes comprises at least one of intra prediction, combined intra-inter prediction, or intra block copy, and the set of parameters values comprises a given quantization parameters value or the coding mode is bi-prediction with non-default bi-prediction weighted averaged weights parameter.

10. The method of claim 8, wherein N is a power of 2.

11. A non-transitory processor-readable medium comprising instructions for performing the method of claim 8, when executed by one of more processors.

12. A video encoding apparatus comprising a processor configured to:

determine, for a block of samples of a picture of a video, from a set of neighboring reconstructed samples, a set of N valid samples, N being an integer, wherein a neighboring reconstructed sample is considered as a valid sample on the condition that the sample has not been coded with a mode amongst a set of coding modes and/or with a parameter amongst a set of parameters values, wherein to determine the set of N valid samples comprises:

when a block height is greater than or equal to a block width or a number of valid neighboring samples at a left of the block is greater than or equal to a number of valid neighboring samples at a top of the block, first adding all valid neighboring samples at the left of the block in the set of N valid samples and adding valid neighboring samples at the top of the block only to complete the set up to N valid samples; and when the block height is smaller than the block width or the number of valid neighboring samples at the left of the block is smaller than the number of valid neighboring samples at the top of the block, first adding all valid neighboring samples at the top of the block in the set of N valid samples and adding valid neighboring samples at the left of the block only to complete the set up to N valid samples;

determine local illumination compensation parameters from the determined set of N valid samples and corresponding reference samples in a reference block; and encode the block from a prediction block obtained by applying local illumination compensation with the determined parameters on the reference block.

13. The video encoding apparatus of claim 12, wherein the set of coding modes comprises at least one of intra prediction, combined intra-inter prediction, or intra block copy, and the set of parameters values comprises a given quantization parameters value or the coding mode is bi-prediction with non-default bi-prediction weighted averaged weights parameter.

14. The video encoding apparatus of claim 12, wherein N is a power of 2.

* * * * *